United States Patent [19]

Van De Vanter

[11] Patent Number: 5,737,608
[45] Date of Patent: Apr. 7, 1998

[54] PER-KEYSTROKE INCREMENTAL LEXING USING A CONVENTIONAL BATCH LEXER

[75] Inventor: Michael L. Van De Vanter, Mountain View, Calif.

[73] Assignee: Sun Microsystems, Inc., Mountain View, Calif.

[21] Appl. No.: 676,815

[22] Filed: Jul. 8, 1996

Related U.S. Application Data

[63] Continuation of Ser. No. 499,088, Jul. 6, 1995.

[51] Int. Cl.[6] .................................................. G06F 9/44
[52] U.S. Cl. .......................... 395/701; 395/792; 395/793; 395/708
[58] Field of Search .................................... 395/705, 708, 395/792, 793, 701, 703, 707, 773, 776, 702

[56] References Cited

U.S. PATENT DOCUMENTS

| | | | |
|---|---|---|---|
| 4,989,145 | 1/1991 | Kyushima | 395/759 |
| 5,493,678 | 2/1996 | Arcuri et al. | 395/601 |
| 5,504,902 | 4/1996 | McGrath et al. | 395/700 |
| 5,513,305 | 4/1996 | Magboulden | 395/761 |
| 5,625,773 | 4/1997 | Bespallo et al. | 395/167 |

OTHER PUBLICATIONS

Shilling, "Incremental LL(1) Parsing in Language–based Editors", IEEE Frans. Soft. Engg., V. 19 N. 9, pp. 935–940, Sep. 1992.

Lunney et al., "Sytax–directed Editing", Software Engg. Journal, V. 3, N. 2, pp. 37–46, Mar. 1988.

Madhavji et al., "Semi–Structured Cursor Movement in MUPE–2". Soft Engg. Journal V. 4, N. 6, pp. 309–317, Nov. 1989.

Zelkowitz et al., "Experiences building a syntax–directed editor", Soft. Engg. Journal, V. 4, N. 6, pp. 294–300, Nov. 1989.

Video: Siggraph Video Review: Magpie—Tektronix. Item #9.

Oman, et al., Typographic Style is More Than Cosmetic (May 1990) Communications of the ACM, May 1990 vol. 33, No. 5, pp. 506–520.

Reps, et al. The Synthesizer Generator Reference Manual (Jul. 1987) Dept. of Computer Science, Cornell University, Section 3, pp. 79–106.

(List continued on next page.)

*Primary Examiner*—Alvin E. Oberley
*Assistant Examiner*—Kakali Chaki
*Attorney, Agent, or Firm*—Douglas J. Crisman; Flehr Hohbach Test Albritton & Herbert LLP

[57] ABSTRACT

A system and method are disclosed that enable a batch lexer to be used to incrementally update a token stream representation of a computer program maintained in an editor as the computer program is being edited. A keystroke executive interprets editing inputs and dispatches editing events to a lexical analyzer. The lexical analyzer converts a range of the tokens likely to be affected to an equivalent old textual stream that preserves whitespace implied by but not represented within the token stream. A new text stream is generated from the old text stream by carrying out the current editing event. I.e., insertion of text is handled by the insertion of the relevant text into the old text stream (now the new stream) and deletion of a character is handled by deleting the appropriate character from the old text stream. The batch lexer is then invoked on the new text stream and as a result returns a new token stream. The fewest possible tokens from the new token stream that reflect the entire impact of the current editing event are returned to the keystroke executive along with an updated editing point within the new token stream as the suggested token stream update. The keystroke executive is free to ignore or accept the suggested update. The new token stream and the new text stream can be generated lazily, respectively one token and one character at a time.

21 Claims, 11 Drawing Sheets

OTHER PUBLICATIONS

Van de Vanter, User Interaction In Language–Based Editing Systems (1992) Chapter 4 and Chapter 5, pp. 35–111 & List of References.

Ballance, et al., Grammatical Abstraction and Incremental Syntax Analysis (1988) University of Calif., Berkeley, pp. 185–198.

Calliss, Problems With Automatic Restructurers (Nov. 1987) University of Durham, Durham, England, pp. 13–21.

Graham, et al., The Pan Language —Based Editing System (Jan. 1992) ACM Transactions on Software Engineering & Methodology, vol. 1, pp. 95–127.

Schwartz, et al., Incremental Compilation in Magpie (Jun. 1984) Sigplan Notice, vol. 19, No. 6, pp. 122–131.

Teitelblaum, et al., The Cornell Program Synthesizer: A Syntax Directed Programming environment (Sep. 1981) Association for Computing Machinery, Inc., pp. 97–116.

Baecker, et al. Human Factors and Typography for More Readable Programs (1987) Chapter 6, pp. 259–279 +List of References & Bibliography.

(5-4) get_lexData();
(5-5) call extendedLexer();
(5-6) get_char();

PER-KEYSTROKE INCREMENTAL LEXING USING A CONVENTIONAL BATCH LEXER

The present application is a continuation of the following prior-filed, pending U.S. patent application made by the present inventor:

Token-Based Computer Program Editor with Program Comment Management (Ser. No. 08/499,088, Filed Jul. 6, 1995).

The prior-filed application is directed to an editor for computer programs that incrementally maintains an internal, token-based representation of the program being edited while providing text-like editing behavior. The present application describes the use of a conventional batch lexer to provide incremental lexical analysis of the internal token-based representation of the program being edited in the previously-disclosed editor.

More generally, the present invention relates to lexical analysis of computer programs and, particularly, to systems and methods that provide incremental lexical analysis of computer programs.

BACKGROUND OF THE INVENTION

An editor, previously described in the cross-referenced application, achieves many advantages by representing programs being edited in fully tokenized form, as opposed to a textual form. As described in that application in order to permit unrestricted textual editing, there must be a mechanism for incrementally revising the tokenized form after each user keystroke (character insertion or deletion) according to the lexical rules of the language in which the program is being written.

A number of incremental programming environments have been built and described in the literature. The goals for these is to reduce the time it takes for the "edit-compile-run" cycle by reducing the amount of compilation work that must be done after each set of edits. This is generally done by determining what parts of the most recent previous analysis may be retained and reused, thereby avoiding unnecessary computation.

One key factor characterizing these past efforts is the granularity of change that is considered each time analysis is performed. Coarse grain incrementality is based on determination of which files or program modules have changed since the previous analysis; this may represent an unbounded amount of editing by a user. What is often called "fine grain" incrementality (for example see U.S. Pat. No. 5,325,531, "Compiler Using Clean Lines Table With Entries Indicating Unchanged Text Lines for Incrementally Compiling Only Changed Source Text Lines") is based on determining which lines of program code have changed; this might also represent an unbounded amount of editing by a user, since many lines may have been changed. Other incremental environments operate at the granularity of program "statements." For example, see Peter Fritzson, "Preliminary Experience from the DICE System, A Distributed Incremental Compiling Environment," Proceedings of the ACM SIGSOFT/SIGPLAN Software Engineering Symposium on Practical Software Development Environments 19,5 (May 1984), 113–123.

The Pan system, described in the author's dissertation and in Robert A. Ballance, J. Butcher and Susan L. Graham, Grammatical Abstraction and Incremental Syntax Analysis in a Language-Based Editor, Proceedings of the ACM-SIGPLAN 1988 Conference on Programming Language Design and Implementation 23,7 (Jun. 22–24, 1988), 185–198, included an incremental lexical analyzer and was characteristic of the "syntax recognizing" approach to program editors, meaning that both textual and structural representations were maintained as the user worked.

The lexical analyzer in Pan (as well as the parser and static-semantic analyzer) was designed to analyze only text that had changed. This lexical analyzer did not handle each keystroke individually, as in the present invention, but instead reconciled two parallel representations: a text stream and a token stream. Which is to say, the input to this analyzer was a modified text stream, not a single keystroke event as in the present invention. Furthermore, this lexer, although it used tables generated by the standard lexer generator "lex," was hand coded, representing a large amount of programmer effort.

The prior art also includes one programming environment that operates on a per-keystroke basis: Mayer D. Schwartz, Norman M. Delisle and Vimal S. Begwani, "Incremental Compilation in Magpie," Proceedings of the ACM-SIGPLAN 1984 Symposium on Compiler Construction, SIGPLAN Notices 19,6 (June 1984) 122–131. According to this paper, the only known reference to this environment, the Magpie system maintains a tokenized representation of the program at all times, updating it per-keystroke. The authors claimed that Magpie was the only existing environment at that time to operate per keystroke. Unlike the present inventor's previously-described system, which, as described in the related application, uses an extended lexical description (tables) to represent accurately anything the user might type, in Magpie "there is a special token, called uninterpreted, that is used to represent either an incomplete token, a lexically incorrect token, or an unscanned portion of the text." It is not clear what portions of the text could be "unscanned" (this means not lexically analyzed) in Magpie; this appears to be in opposition to the claim that everything is analyzed per-keystroke. A further difference is that Magpie's token representation included explicitly the whitespace placed between tokens by the user. Finally, there is no suggestion that a conventional batch lexer was used to support incremental lexing, leaving one to assume (with very high probability) that the incremental lexer in Magpie was completely hand coded.

Another key issue is that the previous environments treated lexical analysis in the traditional relationship to the other conventional phases of batch compilation: lexical analysis, syntactic analysis, static semantic analysis. Following this model, incremental development environments tend to have incremental versions of each of the three phases, but always run them in concert in order to fully analyze the consequences of changes made since the previous analysis. Even the Magpie system, mentioned above, which operated per keystroke, followed this basic model: perform all three phases (or at least attempt to do so) each time analysis is invoked. The invention described in the author's co-pending application performs per-keystroke incremental analysis, as a user edits, thereby maintaining at all times a complete lexical representation of the current state of the program; this approach takes no position on how subsequent phases (syntactic and static semantic analysis might be performed.

The "structure editor" approach is also worth mentioning. Central to this approach is that programs are represented internally as syntax trees, and that the users' primary mode of interaction with the program is assumed to be in terms of that underlying structure. See, for example, Tim Teitelbaum and Thomas Reps, The Cornell program Synthesizer: A Syntax-Directed Programming Environment, Communications of the ACM 24,9 (September 1981), 563–573 for an early research statement, and the commercial descendent of that system Thomas Reps and Tim Teitelbaum, The Synthesizer Generator Reference Manual, Springer Verlag, Berlin, 1989. Third edition. All practical systems of this sort (for programs anyway) are actually hybrids, meaning that they permit ordinary textual editing under some circumstances. And when this textual editing is permitted, an unbounded number of textual edits may be performed between analyses. Thus, lexical analysis is not performed per keystroke.

Therefore, there is a need for a lexical analyzer implementation that can perform incremental lexical analysis on programs internally represented as token streams but which a user edits from within the editor as if they were textually-represented. Ideally, the lexical analyzer implementation would not require a large amount of programmer effort to code lexers capable of performing incremental lexical analysis on token streams representing programs in a variety of computer languages.

SUMMARY OF THE INVENTION

In summary, the present invention is a computer program editor and editing method that meets the needs set out above. Specifically, the present invention is a process for employing a conventional batch lexer to incrementally lex a computer program internally represented as a stream of tokens while the computer program is being edited. This process enables the stream of tokens to be updated to reflect editing actions on the program as the editing actions occur.

The first step involves selecting a range of tokens from the stream of tokens that could be affected by an editing action occurring at an editing point within the range of tokens. The editing point is expressed in token coordinates, which comprise a token index and a character-offset within an indexed token. Next comes the step of forming a hypothetical text stream that is a textual equivalent of the range of tokens and that reflects the past editing action. This hypothetical text stream includes lexical boundaries corresponding to separators existing at token boundaries within the range of tokens. The third and fourth steps involve lexing with the batch lexer the hypothetical text stream so as to compute a hypothetical token stream segment that corresponds to the token range after the editing action and then computing an updated editing point that unambiguously identifies in token coordinates the position of the editing action within the hypothetical token stream. Finally, there comes the step of updating the original stream of tokens and editing point using information from the hypothetical token stream and the updated editing point, respectively.

As the outcome of this process, the token stream is updated to reflect the current editing action and the update is seamlessly displayed to the user as if the program being edited were being edited in a conventional text editor.

BRIEF DESCRIPTION OF THE DRAWINGS

Additional objects and features of the invention will be more readily apparent from the following detailed description and appended claims when taken in conjunction with the drawings, in which:

FIG. 5 is a process flow diagram chart showing the interactions of the keystroke executive and object instances of the classes shown in FIG. 4 as they incrementally update the token stream representation of a computer program following an input event.

DESCRIPTION OF THE PREFERRED EMBODIMENT

Figure 1:
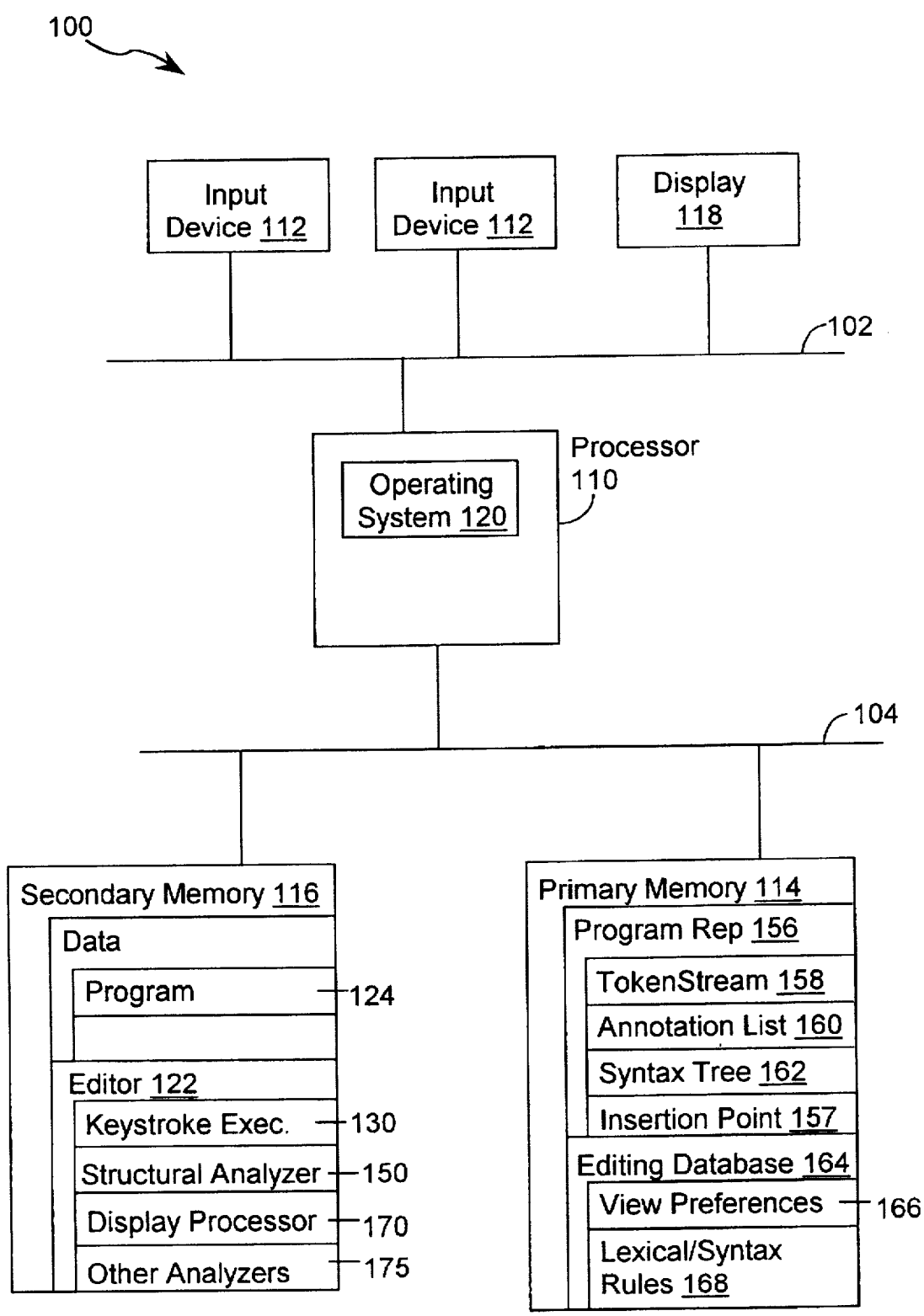
FIG. 1 is a block diagram of a computer system incorporating the computer program editor of the present invention.

Referring to FIG. 1, there is shown a block diagram of a computer system 100 incorporating an editor 122 from which a user can edit a structurally-represented program 124 as if it were represented as a stream of characters. The system 100 has a processor 110 coupled to a primary memory 114 and a secondary memory 116 via a local bus 104. The system also includes at least one input device 112, such as keyboard and/or a mouse, and a display 118 coupled to the processor via a peripheral bus 102. The operation of these elements is set out below.

The system 100 is controlled by operating system software 120 executing in the processor 110. Other executable application software, including the editor of the present invention 122, are stored in the secondary memory 116, as are data files such as the program to be edited 124. As shown in FIG. 1, the editor 122 includes a keystroke executive 130, a structural analyzer 150 and a typographical display facility 170, which are described in depth below. The editor 122 also includes other analyzers, such as a semantic analyzer 175. As the program 124 is edited, the editor constantly updates the internal program representation 156, which is maintained in the primary memory 114. This internal representation 156 has four principal components: a token stream 158 and an annotations list 160, which together compose a program quantum; an optional syntax tree 162, including associated static semantic information; and an insertion point 157, all of which are described below. Many behaviors of the editor 122 are determined by a customizable editing database 164, also resident in the primary memory 114 during editing, which includes user view preferences 166 and lexical/syntactical rules 168 for the language in which the program 124 is written.

The keystroke executive 130 performs lexical analysis by applying the lexical rules 168 to the token stream 158 and the structural analyzer 150 performs syntax analysis on the token stream 158 by applying the syntactical rules 168. These two analysis processes correspond to the lexical and syntactical analysis phases of a compiler. To analogize to the analysis of a document written in English, lexical analysis involves breaking down the document into its constituent words and punctuation. On the other hand, syntax analysis involves evaluating the document's sentence structure. Thus, an English syntax analyzer would be able to indicate that the adjective blue is incorrectly placed in the following sentence: "The boat blue is fast." Of course, this sentence would be declared legal if it were translated into French and evaluated by a French syntax analyzer, as adjectives follow nouns in French. Similar roles are played in the program editor 122 by the keystroke executive 130 and the structural analyzer 150. That is, the keystroke executive 130 classifies the program's words according to the parts of speech, or lexemes, of the respective computer language in which the program is written by analyzing only small chunks of code. The structural analyzer 150 then evaluates, based on the lexical properties of the program words, whether a line of code, series of nested if statements, function, or other large scale program structure is correctly formed according to the syntax of the program language. In a significant departure from compilers or structure editors, which may perform either or both of these functions, but always together, in the present editor 122, lexical analysis is independently useful apart from its role as a front end to structural analysis.

When a user invokes the editor 122 against a program to be edited 124, the operating system 120 loads the editor 122 and the program 124 into the primary memory 114 and begins executing the instructions of the editor 122 in the processor 110, at which point the user can edit the program 124. The program 124 could be an existing program or a new program, although that fact has little bearing on the operation of the editor 122, which is more fully described below in reference to FIG. 2.

Figure 2:
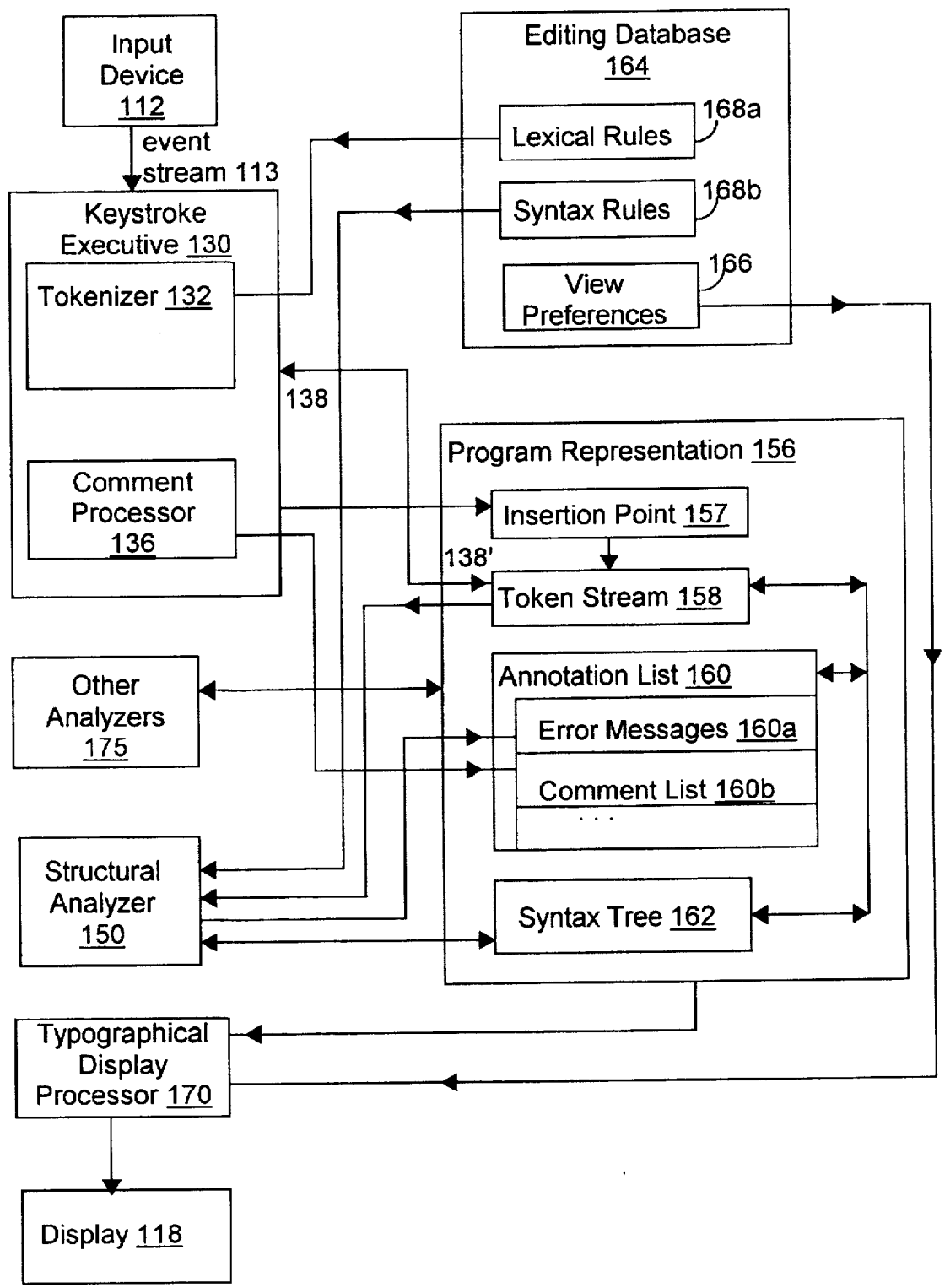
FIG. 2 is a block diagram of a preferred embodiment of the computer program editor of the present invention.

Referring to FIG. 2, there is shown a block diagram illustrating additional details of and functional relationships between the input device 112, editing routines 130, 150, 170, the program representation 156, the editing database 164, and the display 118 while the program 124 is being edited. Additional editor 122 elements not shown in FIG. 1 include the tokenizer 132 and comment processor 136, which are functional blocks within the keystroke executive 132, and the error messages 160a and comment list 160b, which are objects within the annotation list 160. Moreover, in FIG. 2, the lexical/syntax rules 168 from FIG. 1 have been subdivided into lexical rules 168a and syntax rules 168b.

The user edits the program 124 by interacting, through the input device 112, with the displayed version 118 of the program being edited. When the input device 112 includes a keyboard, these interactions could include keystrokes directing the editor 122 to move the cursor (when the user uses the cursor control keys), insert a space at the cursor (when the user hits the spacebar), delete the editable element to the left or right of the cursor, insert a character at the cursor (when the user types a character), or break the current line (when the user hits the enter key). When the input device 112 also includes a mouse, these interactions could also include various types of mouse clicks. The input device relays all of these interactions, or input events, to the keystroke executive 130 as an event stream 113.

The keystroke executive 130 is the key component of the editor 122 and is responsible for receiving every input event from the input device 112; updating, based on the event stream 113, the token stream representation 158, and managing the insertion point 157, which defines the position of the cursor with which the user performs all basic editing operations. Consequently, the keystroke executive 130 has read/write access to the insertion point 157 and the token stream 158, and is coupled to the input device 112, from which it receives the event stream 113. The tokenizer 132 is a subfunction of the keystroke executive and executes only when called by the keystroke executive 130, which, in the case of an insert character input event, passes the tokenizer 132 the newest character of the event stream 113, a subset, or token stream segment 138, of the token stream 158 and the position of the character being inserted relative to the token stream segment 138. In addition to the inputs it receives from the keystroke executive 130, the tokenizer 132 has read access to the lexical rules 168a; after executing, the tokenizer 132 returns its result to the keystroke executive 130. The comment processor 136 is another subfunction of the keystroke executive 130, which passes the comment processor 136 all input events 113 related to the editing or entering of program comments. Based on these comment-related input events, the comment processor creates and maintains comment objects, which it stores in the comment list 160b.

At the same hierarchical level of the editor 122 as the keystroke executive 130 is the optional structural analyzer 150, which has read access to the syntax rules 168b and the token stream 158 and write access to the error messages list 160a, to which it outputs syntax error messages. More critically, the structural analyzer 150 is coupled to the syntax tree 162, which it creates, updates and maintains based on the token stream 158 and the syntax rules 168. Unlike the keystroke executive 130, the structural analyzer 150 is not called after ever keystroke of the input device 112, but when its intervention is requested by the user or when there is some other opportunity.

The structural analyzer 150 is optional because the syntax tree 162 it maintains is not required for the program 124 to be edited or displayed in the editor 122. Both of these functions can be adequately performed by the editor 122 solely on the basis of information in the token stream representation. Instead, the syntax tree 162 provided by the structural analyzer 150 is only necessary for fine tuning the pretty printed display of the program being edited 124 and for ancillary editing services, none of which are essential functions of the editor 122. For the purposes of this document, the term "syntactical analysis" encompass all or part of the syntax and static semantic analysis performed by a compiler in, respectively, its second and third passes over a source code file (the first pass being lexical analysis). As described above, in the art of compilers, syntax analysis determines whether the tokens generated by during the lexical analysis pass are in legal positions according to the syntax rules of the programming language. Static semantic analysis takes an even wider view of the program being compiled. For example, static semantic analysis generates type information for variables used in statements already syntactically analyzed by referring to variable declarations not cognizable by the parser.

The typographical display processor 170 has read access to the data structures 157, 158, 160, 162 composing the program representation 156 and the view preferences 166, which are contained in the editing database 164. Based on the user's view preferences 166, which define the type of editing information the user wishes to be displayed, the typographical display processor 170 typesets or prettyprints the information in the program representation 156 to the display 118, to which the display processor's output is coupled. The term "prettyprinting" means formatting the display of a program or other document, using techniques similar to those used by typesetting programs, to generate a well-formed and aesthetically pleasing image.

While all of these elements are important to the operation of the editor 122, the key improvements made by the editor 122 lie in (1) the form of the internal program representation 156 and (2) the operation of the keystroke executive 130. These aspects of the editor 122 are now described.

As mentioned above, as the program 124 is entered or edited, the keystroke executive 130 receives the event stream 113 and accordingly updates the token-stream representation 156 of the program 124 after each user keystroke or mouse click. Each of the tokens in the token stream represents a "word" of the program 124, where "word" means a symbol or group of symbols that can be classified as any of the basic building blocks, or lexical classes, of a computer language such as strings (e.g., "hello, world"), arithmetic operators (e.g., +, −, /, =), keywords (e.g., char, struct, float) or floating point constants (e.g., 2.0 E+5). Thus, as the program 124 is being entered, the keystroke executive 130 is able to create useful program information that would not be available from a text processor, including (1) the tokens or "words" of the program 124 and (2) the lexical types of the tokens (e.g., float constant, string, variable, keyword). Moreover, because the keystroke executive 130 also controls the insertion point 157 of the cursor, with which the user edits the program 124, the keystroke executive 130 is also able to provide on the fly the position of each token within the token stream. Thus, as the user types, the keystroke executive 130 creates a representation of the program 156 in which each word of the program is lexically classified, tokenized, and associated with a unique position in the token stream 158. This is an ideal representation for a program editor as (1) it can be maintained on the fly as the user types, (2) it provides enough reliable, lexical information that the program can be prettyprinted or typeset as it is entered by the user, and (3) it allows other language-based services to be implemented even when syntax analysis is not successful. This representation is also the ideal compromise between a flexible, but informationally-empty, text representation, and a rigid, but informationally-rich purely-structural representation. Note however that not all information entered by the user or generated by the editor 122 regarding the program 124 is stored in the token stream 158. Other information, such as program comments, which are not actual program statements, are stored in the annotation list 160, as are the syntax error messages generated by the structural analyzer 150 as it parses the program 124. This type of ancillary information is stored apart from the token stream 158 primarily for efficiency reasons; however, because all of the annotations are indexed to appropriate anchor points within the token stream 158, it is always possible to re-associate the annotations and the tokens, which collectively are referred to as a quantum.

In rare editing situations, the keystroke executive 130 modifies the token stream 158 using language-independent rules. For example, if a user deletes the single character of a single character token, the keystroke executive 130 just deletes the token. This requires no language-specific knowledge. However, for most other editing situations, which demand specialized lexical knowledge, the keystroke executive 130 must seek advice from the tokenizer 132, which is an expert in the incremental, lexical analysis of program code, as to how the token stream 158 should be updated in light of new input events 113 typed at the current insertion point 157. In this querying process, the keystroke executive 130 passes the tokenizer 132 a few tokens 138 from the token stream 158 that are adjacent to the current insertion point 157 and a particular request to evaluate an insertion or deletion in light of the token stream segment 138. The tokenizer 132 then suggests an update 138' to the token stream 158 by interpreting the few tokens in light of the lexical rules 168a provided in the editing database 164. These lexical rules 168a are similar to conventional lexical rules that might be used in a batch-mode lexical analyzer, such as "Lex", but are extended to account for illegal and incomplete lexemes that arise when the program 124 is lexically analyzed as it is being entered.

Anytime the keystroke executive 130 determines that the user is entering a new comment or editing an existing comment, it calls the comment processor 136, which has expertise in maintaining and updating the comment list 160b. While the comment processor 136 is processing a comment, the keystroke executive 130 passes all input events in the event stream 113 to the comment processor 136, which simultaneously updates the appropriate comment in the comment list 160b as if it were a simple text editor (i.e., the comment processor 136 performs no lexical analysis on the input events). When the keystroke executive 130 detects a new comment trigger, such as a comment beginning delimiter, the comment processor 136 allocates a new comment record in the comment list 160b.

Based on the token stream 158 and annotations 160, the typographical display processor 170 typesets, or prettyprints, the program 124 to the display 118 as the user types. In addition to prettyprinting the program 124, the editor 122 can provide a wide range of program editing services, such as language-sensitive support and highlighting, which are also based on the token stream representation 158 of the program 124. Moreover, even though the program is internally represented as a token stream 158, the editor 122 allows the user to interact with the program being edited as if it were internally represented as text; i.e., the behavior of the editor 122 is practically indistinguishable from a word processor. The keystroke executive 130 and typographical display processor 170 of the editor 122 make this text-like editing behavior possible by carefully managing (1) the movement and placement of the cursor, which is the means by which the user interacts with the displayed program 118, and (2) the display of whitespace, or gaps, between adjacent tokens in the token stream 158.

The editor 122, as an option, also allows a user to request a full syntactical analysis, including static semantic analysis, or "update" of the program 124 to supplement the less complete, but still useful, token stream representation of the program 158. Alternatively, the editor 122 may perform an optional update whenever there is an opportunity to do so. In either case, to perform the update, the editor 122 calls the structural analyzer 150, which analyzes the token stream 158 in light of the language-specific lexical/syntax rules 168, and then updates or forms (when the program 124 is newly entered) the syntax tree 162 of the program 124. The information gleaned from the update is then used by the typographical display processor 170 to update the token-based information on the display 118. When the structural analyzer 150 encounters parts of the program 122 not susceptible to syntactical analysis due to the presence of syntax or lexical errors, neither the syntax tree 162 nor display of those parts is modified. Thus, the editor 122 is capable of seamlessly merging information from the two representations on the display 118 in a way that provides all available useful information without hindering the user.

The typographical display facility 170 prettyprints the program 124 to the display 118 based on the token stream 158 from the keystroke executive 130 and/or the syntax tree 162 from the last update generated by the structural analyzer 150. The typographical display processor 170 also displays the various annotations 140, including error messages 160a and comments 160b alongside the displayed program in an intuitively useful manner determined by the user. The typographical display facility 170 also controls the visual whitespace between displayed tokens and positions the cursor at the insertion point in the displayed program so that the user can edit the displayed program as if in a text based editor rather than a structural editor.

Having briefly surveyed the structure and operation of the principal components of the editor 122, they will now be discussed in detail, beginning with the keystroke executive 130.

Keystroke executive 130

Figure 3:
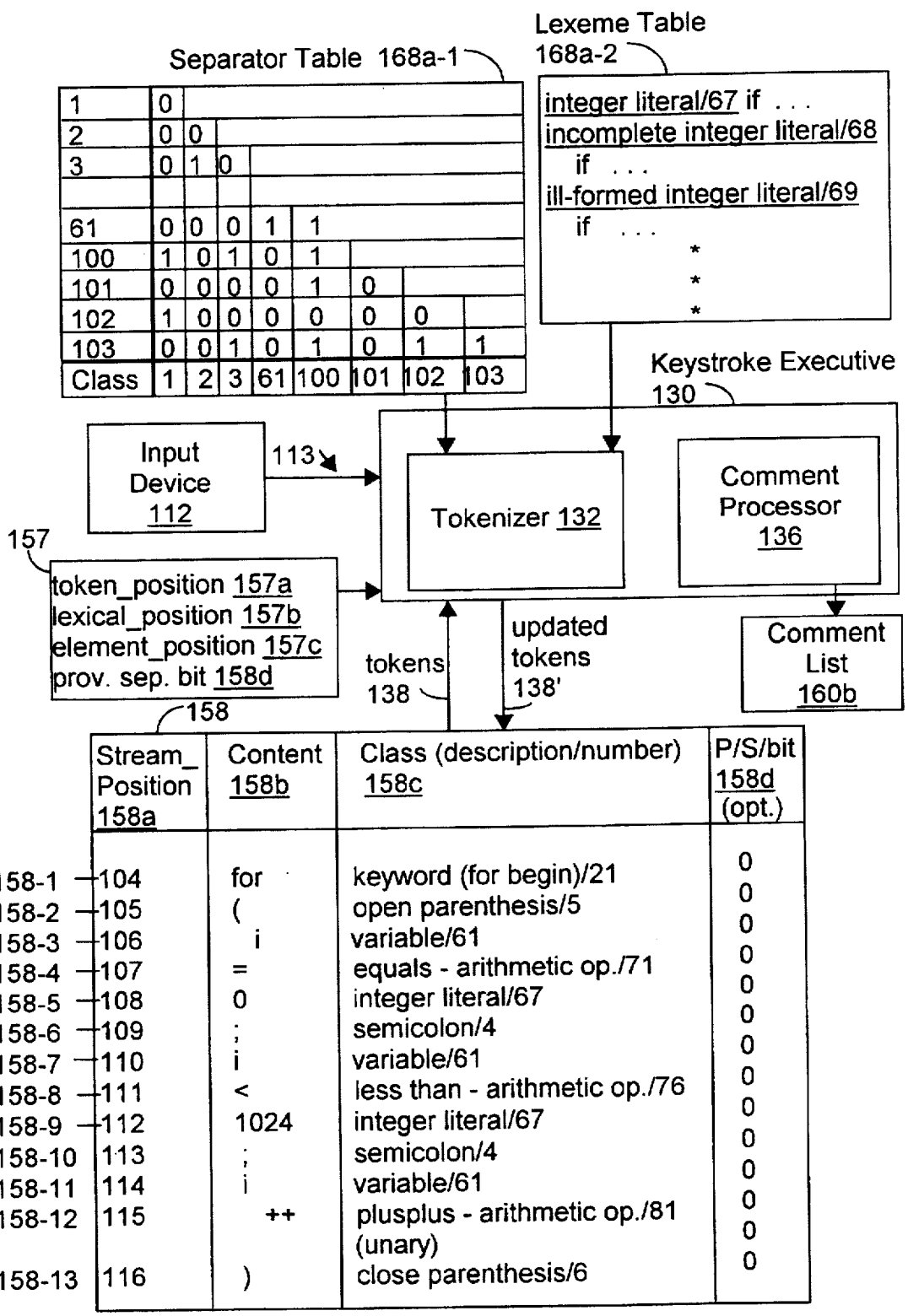
FIG. 3 is a block diagram of the keystroke executive of FIG. 2 and the data structures with which it interacts.

Referring to FIG. 3, there is shown a block diagram of the keystroke executive 130, including additional details of data structures with which the keystroke executive 130 and its subroutines interact. The only system elements shown in FIG. 3 that are not represented in FIG. 2 are the separator table 168a-1 and the extended lexeme table 168a-2, which are elements of the lexical rules 168. The structure of these two tables 168a-1 and 168a-2, the insertion point 157 and the token stream 158 are described below.

As was said above, the keystroke executive 130 transforms, often with the assistance of the tokenizer 132, the input events 113 being entered by the user editing the program 124 into changes to a token stream 158. In the preferred embodiment of the present invention shown in FIG. 3, the token stream 158 is stored as an ordered list of tokens, where each token in the list is characterized by: (1) its position 158a in the token stream 158, (2) its constituent symbols, or content, 158b, and (3) its lexical type, or class, 158c. Additionally, each token may include an optional, boolean, provisional separator bit. For example, the tokens 158-1 through 158-13 occupy positions 104 through 116 in the token stream 158 and correspond to the following C-language for-statement (the examples in this document are drawn from the C and C++ computer languages) entered from the input device 112 and processed by the input device executive 130: for (i=0; i<1024; i++). Note that the keystroke executive 130 has transformed this one line expression into a series of 13 tokens, each associated with corresponding symbols from the event stream 158b and a lexical class 158c. Also note that the token class 158c is represented in two ways: as a lexical class description (e.g., "keyword (for begin)") and a corresponding numerical class (e.g., "21"); this class number 158c is how the other routines and data structures of the editor 122 (e.g., the separator table 168a-1 or the typographical display processor 170) refer to the class of a token.

A. Extended Lexeme Table 168a-2:

The lexical class information 158c is generated by the tokenizer 132 and the keystroke executive 130 according to the lexical rules in the extended lexeme table 168a-2. This extended lexeme table 168a-2 is structured like lexeme tables used in batch-mode lexical analyzers, or lexers, such as Lex, in that it contains a series of rules defining the lexemes or lexical classes of the language in which the program is being entered. However, the extended lexeme table 168a-2 is larger than a conventional lexeme table for the same language. This is because the extended lexeme table 168a-2 must account for the many "incomplete" and "ill-formed" tokens that are formed as the user enters and/or edits the program 124, which is lexically analyzed by the keystroke executive 130 or the tokenizer 132 after every input event.

For example, as would a conventional lexeme table, the extended lexeme table 168a-2 includes a lexical rule that defines a legal integer literal (class 67) expressed in hexadecimal ("hex") format, which, in C/C++, corresponds to the string "0x" followed by a series of symbols "#", where "#" is an integer between 0 and 9 or a character between A and F. However, unlike a conventional lexer, the extended lexeme table 168a-2 also includes rules that define incomplete integer/hex literals (the string "0x" followed by nothing else), and ill-formed integer/hex literals (the string "0x" followed by at least one symbol "$", where "$" is not an integer between 0 and 9 or a character between A and F). These extended lexemes (i.e., incomplete and ill-formed lexemes) are necessary in the present editor 122, which aims to provide useful lexical information regarding the lexical classes of the tokens in the token stream 158 as the user inputs the corresponding event stream 113. Such extended token information is not necessary in a conventional lexer, which, as the front end of a compiler, simply rejects either kind of token as illegal without any further attempts to classify them. The preceding discussion is a brief description of the extended lexeme and on-the-fly analysis of tokens. A more complete explanation is provided in the same inventor's co-pending U.S. patent application, Method and Apparatus for Diagnosing Lexical Errors, Ser. No.: 08/305,220, filed Sep. 13, 1994.

For example, consider the following event stream 113 which is generated by a user typing an integer hex literal, and the corresponding token stream representation 158, which is generated keystroke-by-keystroke by the keystroke executive 130. In this illustration, the character just typed by the user is underlined and the corresponding insertion point 157 in the token stream 158 after the keystroke is marked with a "|" character.

TABLE 1

| Event stream 113 | Position 158a | Content 158b | Lexical Class 158c |
|---|---|---|---|
| 0 | 1 | 0| | Integer literal |
| 0x | 1 | 0x| | Incomplete integer literal |
| 0x5 | 1 | 0x5| | Integer literal |
| 0x5H | 1 | 0x5H| | Illegal integer literal |

In this example, note how the lexical class changes as the user types. This is because the keystroke executive 130 lexically analyzes the event stream 113 after each user keystroke. Also note that the token stream position 158a does not change as the user's keystrokes have the effect of modifying a single token, which, in this example, is the first token. Rather, what does change after each token stream 158 update is the insertion point 157, which marks both the keystroke executive's work position in the token stream 158 and the position of the cursor (displayed to the user on the display 118), with which the user interacts with the program being edited.

B. Token Boundaries

In another marked contrast to text editors, the keystroke executive 130 does not represent in the token stream 158 spaces typed by the user between program tokens (however, as will be discussed later, the keystroke executive 130 does represent in the token stream 158 typed spaces in string and character literals). Instead, the textual role played by whitespace in conventional text editors is replaced in the token stream 158 by token boundaries maintained by the keystroke executive 130 as the user types. Most token boundaries are implicit in what the user types and are recognized by the keystroke executive 130 and tokenizer 132 through lexical analysis. At such implicit boundaries there is no editable element between tokens.

For example, recall that the tokens 158-1 through 158-13 in the token stream 158 shown in FIG. 3 correspond to the event stream "for(i=0; i<1024;i++)". This expression could have been entered from the input device 112 in many ways, all semantically equivalent; e.g., the user might have typed the event stream 113 as "for_(i_=_0;_i<1024;_i++)" or as "for(i=0;_i<1024;_i++)", where the "_" symbol corresponds to a typed space in the event stream 113. To the user entering this text, these spaces play an important role. For example, they provide visual separation between adjacent program words and, as they are directly displayed by text editors, are an integral component in rendering a pleasing display of the program 124. However, none of these spaces are necessary in a semantic sense; i.e., their presence or absence does nothing to change the meaning of the for-loop expression (although in some situations, covered below, spaces do provide semantic information). Consequently, the keystroke executive 130, in tokenizing these event streams, discards any spaces entered by the user between the tokens 158-1 through 158-13. That is, the boundaries between the tokens 158-1 through 158-13 are implicit, being lexically inferable from the lexical classes of the adjacent tokens. At such implicit boundaries there are no editable elements between the tokens.

1. Separators

There are also ambiguous token boundaries, where the program language would require a space in a purely textual representation (i.e., ambiguous boundaries are token boundaries where a space would be required in the textual equivalent of the token stream to preserve the boundary). In these cases, the keystroke executive 130 creates a separator, an editable element that acts something like a space. More specifically, in the present editor 122, a separator will only be associated with adjacent tokens in the token stream 158 that could legitimately be merged into one token. Generally, this determination is made by comparing the content of what the user is typing to the language definition of the program such as defined in the extended lexeme table 168a-2.

For example, no separator is needed between the two tokens "for" and "("in the token stream" for("because those two tokens cannot legitimately be merged. In other words, no space is required in the textual equivalent of the token stream to preserve the boundary between the program words "for" and "(", which is not an ambiguous boundary. As a result, regardless of whether the use types "for_("or "for(", the keystroke executive 130 always gives the same token stream without a separator: "for", "(".

In contrast, if the user types two adjacent "+" characters without any intervening spaces, the keystroke executive 130 generates a single corresponding plus-plus token "++", but if the user types a plus character "+" followed by a space "_" then another plus character "+", the keystroke executive 130 returns a different token stream with two tokens and an intervening separator: "+□+". Note that the separator in the two token example is not required because the token stream representation of the event stream "+_+" would be ambiguous without it; in fact, the event stream "+_+" could be unambiguously represented as two adjacent plus ("+") tokens having an implicit token boundary. This separator is also not required to create a pleasing display of the program 124 as the typographical display processor 170 displays visual whitespace between adjacent tokens based on their respective lexical classes, not user-entered spaces. Rather, the separator in the token stream 158 corresponding to the event stream "+_+" is required so that the user can edit the corresponding stream as if it were text. Le., by providing an editable separator corresponding to the displayed whitespace between the two plus tokens, the editor 122 gives the user an object to delete, whose deletion instructs the keystroke executive 130 to join the separated tokens into the single token, "++". If this separator were not present, there would be no simple, text-like way in which a user could join the two tokens.

For example, consider the editor's behavior if a necessary separator were missing. If there were only an implicit boundary between the tokens (i.e., if the event stream "+_+" were internally represented as the two adjacent tokens "+" and "+"), the user might place the cursor ("1") in the whitespace between the displayed tokens as follows: "+1+", and hit the rubout key, thinking this action should delete the space between the tokens, thus textually joining them. However, because the only editable element to the left of the cursor is the leftmost plus token, this action would only result in the keystroke executive 130 deleting that leftmost token. Thus, adding a separator between the two plus tokens allows the user to join the two tokens in a familiar, text-like manner (i.e., by putting the cursor between the separator and the rightmost plus token, then deleting backwards). Moreover, because a separator serves only an editing purpose and not a visual (whitespace) purpose, the keystroke executive 130 will allow only one separator between tokens, no matter how many spaces a user enters. In addition to serving as an editable element, a separator acts as an immutable token boundary; i.e., adjacent tokens with an intervening separator may never be joined as a side effect of other operations.

The preceding discussion set out what separators are; i.e. they are editable elements that act like textual space and define immutable token boundaries. The following discussion sets out various ways in which separators are implemented in the present editor 122.

a. Separators-Implementation:

As stated above, the tokenizer 132 or the keystroke executive 130 determines whether a separator is required in each token boundary based on lexical properties of the two surrounding tokens. In the preferred embodiment of the present invention, the keystroke executive 130 does not actually represent any required separators in the token stream 158, but decides, on the fly, whether a separator exists or should exist between two tokens. Alternatively, based on the same type of decision procedure, the keystroke executive could actually add an explicit separator to the token stream 158.

This decision procedure can be implemented by the editor 122 in two different ways, one approximate but conservative (meaning that some unnecessary separators are introduced into the token stream, but that no necessary separators are omitted), the other exact (meaning that only necessary separators are introduced into the token stream). The approximate procedure must be conservative as it is ok with respect to editing behavior to have additional separators but absolutely critical not to omit necessary ones.

The preferred embodiment of the present invention implements the approximate but conservative approach. In this approach, the keystroke executive 130 or tokenizer 132 determines the need for a separator between two tokens by referring to the separator table 168a-1 on the basis of the lexical classes 158c of the adjacent tokens. The separator table 168a-1, as is shown in FIG. 3, consists of a grid of boolean separator values (0/1>no separator/separator) indexed by the lexical class of two adjacent tokens in the token stream 158. For example, if the leftmost of the two adjacent tokens has a class 158b of "101" (reading the vertical axis of the table 168a-1 ), and the rightmost has a class 158b of "100" (reading the horizontal axis of the table 168a-2), they would be separated by a separator as their intersection in the separator table 168a-1 has a boolean separator value of "1". This is an approximate approach because it is based on the lexical classes of the adjacent tokens and not the particular tokens being lexically analyzed. For example, class-oriented rules in the separator table 168a-1 would indicate that a separator should always be included between an identifier on the left and a floating point number on the right. This rule is required because a user might occasionally want to join these types of tokens; e.g., where the left token is "A" and the right token is the floating point number "1E5", these two tokens could legitimately be merged into the single token identifier "A1E5". However, because this rule is conservative, it introduces an unnecessary separator in other situations where the textual equivalent of adjacent tokens of the same respective classes have an unambiguous boundary; e.g., where the left token is "A" and the right token is "0.1E5", the tokens cannot legitimately be joined. Using this approximate approach it is ok to add unnecessary separators (although this does require some special editing approaches), but it is not ok to eliminate necessary separators. For an example of such a case where the separator is critical, see the "++" example set out above. Thus, the approximate approach embodied in the extended lexeme table 168a-2 errs on the side of adding unnecessary separators.

As intimated above, this approximate and conservative approach does cause some editing problems, such as when a user tries to delete an unnecessary separator such as the one associated with the boundary between the token "A" on the left and the token "0.1 E5" to the right (in this case the editor 122 simple moves the cursor over the unnecessary separator). However, this table lookup method is a fast, resource-efficient approach that can be executed on the fly as the user of the editor 122 generates the event stream 113. Moreover, it should be noted that unnecessary separators occur rarely in practice in languages such as C and C++ because the adjacent tokens that would give rise to an unnecessary separator never legitimately occur next to each other.

Like the approximate approach, the exact decision procedure is rule-based, but rather than being token class-oriented, this latter approach evaluates the specific adjacent tokens according to a set of lexical rules to determine whether adjacent tokens could legitimately be joined. For example, the efficient approach would prescribe a separator between the tokens "A" and "1 E5" but not between the tokens "A" and "0.1 E5". This approach eliminates editing side effects as described above, but is more computationally intensive.

2. Provisional Separators

Provisional separators are a temporary record that the user has just hit the space bar in a place, such as between two tokens, where there is no need of an additional separator. The keystroke executive 130 or tokenizer 132 makes use of these provisional separators based on the assumption that the user must have typed the space for a good reason, thus, a record of the space should be preserved, if only for a short time. This allows the user to enter a new token whose boundary with the previous token is ambiguous, in which event the keystroke executive 130 eventually converts the provisional separator to an ordinary separator. If the user types a new token whose boundary with the previous token is not ambiguous, the keystroke executive 130 merely eliminates the provisional separator. In the preferred embodiment of the editor 122, there can be only one provisional separator in the token stream 158, and it only exists immediately to the left of the insertion point (described later).

For example, assume that the user wishes to modify the text expression "a=b" to read "a_c=b". In a text editor, a typical user might accomplish this change by placing the cursor to the left of the equals sign in the first expression, hitting the spacebar and typing a "c" following the space. However, in the editor 122, the event stream "a=b" is actually represented as the token stream 158 shown in Table 2 consisting of three tokens with no intervening separators.

TABLE 2

| position 158a | content 158b | class 158c | p/s/bit 158d |
|---|---|---|---|
| i | a | variable/61 | 0 |
| i+1 | = | equals-arith.op./71 | 0 |
| i+2 | b | variable/61 | 0 |

Thus, in the absence of a provisional separator, when the user places the insertion point 157 between the tokens "a" and "=" and strikes the spacebar, the keystroke analyzer 130 would make no corresponding change in the token stream 158. I.e., the space typed by the user would not be recorded or recoverable. This is because the insertion point 157 already corresponds to an implicit token boundary between unambiguous tokens. Thus, when the user goes on to type the "c", which textually has an ambiguous boundary with the token "a" (i.e., "a_c" has a different textual meaning than "ac"), the keystroke executive 130 would not introduce the necessary separator at the boundary between the "a" and "c" tokens and instead would form the updated token stream "ac=b". However, as the present editor 122 assumes that the user must have typed the seemingly superfluous space for a reason, it provides a means (the provisional separator) for representing this kind of editing activity in the internal token stream 158, which allows the editor to change the provisional separator to an ordinary separator when the user enters the "c".

In the preferred embodiment of the present invention, the provisional separator is represented as a boolean provisional separator bit 158d (0/1>set, not set) in the insertion point data structure 157. Thus, in the present editor 122, there is only one provisional separator permitted in the token stream 158, and, if present, it is always understood to exist only to the left of the insertion point. This is because a provisional separator is an ephemeral object created by the editor 122 as a result of an immediately preceding input event. In another preferred embodiment of the present invention, the provisional separator is represented as an additional bit each token in the token stream 158 indicating whether the token is followed by a provisional separator.

To allow the kind of editing behavior expected by users of text editors, the keystroke executive 130 or tokenizer 132 sets the provisional separator bit 158d whenever the user types a space at an existing token boundary where no separator is present. Thus, in the above example, the tokenizer 132 sets the provisional separator bit 158b when the user types a space between the "a" and "=" tokens; and the resulting token stream would read: "a■=b" where "■" represents the provisional separator 158b at the insertion point 157). After the tokenizer 132 inserts the provisional separator in the token stream, the typographical display processor 170 will display the provisional separator as a space, but possibly in a way that is distinct from a displayed ordinary separator. Generally, a provisional separator 158b is ephemeral, being reset to 0 by the keystroke executive 130 and possibly replaced by an ordinary separator depending on the next user keystroke. In the example above, assuming that the user types a "c" at the provisional separator "■", the tokenizer 132 will appropriately replace the provisional separator with an ordinary separator, meaning that the token stream 158 now reads "a☐c=b". The tokenizer uses the ordinary separator in this case as the token boundary between the tokens "a" and "b", which are both of the lexical class "variable/61", is ambiguous. If the user typed a plus sign "+" at the provisional separator instead of "c", the tokenizer 132 would remove the provisional separator completely as the resulting boundary between "a" and "=" in the expression "a+=b" would be unambiguous. Note that the tokenizer 132 will never enter more than one provisional separator between adjacent tokens into a flow.

The insertion point 157 can occupy many possible positions with respect to an individual token and the aforementioned separators. However, of these myriad insertion point positions, only the six basic positions shown in Table 3 are necessary to the following discussion of the token stream and insertion point updating performed by the keystroke executive 130 (i.e., Table 3 is not exhaustive). Each row of Table 3 describes the insertion point, shows its associated index, which will frequently be referred to in the following discussions, and also includes an example of a token stream segment ("n: in int") showing the respective insertion point 157. In these examples, "(", "n", ":", "in", "int" and ")" are all tokens and the vertical bar ("|") marks the insertion position 157 and the corresponding cursor position. Ordinary separators and provisional separators are shown as a hollow box "☐" and a filled box "■" respectively.

Table 3: Basic Insertion Point Positions

|    | Position | Example |
| --- | --- | --- |
| 1: | Within a token. | (n: i|n☐int) |
| 2: | Between tokens on a line, no separator. | (n: |in☐int) |
| 3: | Between tokens on a line, at left of a separator. | (n: in|☐int) |
| 4: | Between tokens on a line, at right of a separator. | (n: in☐|int) |
| 5: | Between tokens on a line, at right of provisional separator. | (n: ■in☐int) |
| 6: | Between tokens on a line, at left of a sep, at right of prov. sep. | (n: in■☐int) |

Thus, the keystroke executive 130 must have access to the following information to unambiguously locate the cursor in the token stream 158:

(1) the token-oriented position (one of the six values from above), (2) if the token-oriented position is "1", the token-stream position of the token in which the insertion point is positioned, or, if the token-oriented position is not "1", the token-stream position of the token to the right of the insertion position;

(3) the specific editable element to the right of the insertion point; and (4) the provisional separator bit 158d.

Except for the provisional separator bit 158d, this cursor positioning information can be stored in a data structure accessible to the keystroke executive 130 or can be determined on the fly by the keystroke executive 130 from the editing context. The preferred embodiment of the present invention adopts the latter approach; however, for the purposes of this application, the four values (1) through (4) are illustrated in FIG. 3 as the lexical_position 157b, the token_position 157a, the editable_element_position 157c, and the provisional separator bit 158d of the hypothetical insertion point data structure 157.

C. Lexical Analysis Process

As set out above, maintaining the token stream 158 on the fly requires the keystroke executive 130, with the assistance of the tokenizer 132, to recognize all of the lexemes allowed by the language in which the program is being entered. Lexical analysis to this extent is well-known in batch-oriented tokenizer's, such as "Lex", which are executed on a program after the program has been entered. However, to maintain the token stream 158 on the fly completely and accurately, the keystroke executive 130 and the tokenizer 132 must also recognize the ill-formed and incomplete lexemes that are formed while a user of the editor 122 is typing.

Maintaining the token stream 158 in this manner requires the keystroke executive 132 to analyze the impact of each user keystroke in the context of a small portion of the existing token stream 158 (called a token stream segment 138), insertion point 157, extended lexeme table 168a-2 and separator table 168a-1. Of course, the number of tokens in the token stream segment 138, and their positions relative to the current insertion point depends on the lexical characteristics of the programming language in which the program is being entered. For example, in C or C++, the keystroke analyzer 130 generally needs to analyze no more than the tokens adjacent to the token containing the insertion point.

While the keystroke executive 130 can sometimes update the insertion point 156 and token stream 158 by itself (e.g., when a user deletes the single character of a single character token), in most situations it must consult with the tokenizer 132, which will suggest an update to the token stream segment 138 based on the extended lexical rules 168a-2. In such a consulting situation, the keystroke executive 130 queries the tokenizer 132 differently based on whether the current editing operation is an insertion or a deletion. In the case of an insertion, the keystroke executive 130 passes the tokenizer 132 a token stream segment 138 consisting of the token to the left of the insertion point and all of the tokens to the end of the current line of text, the character to be inserted, and the position at which that character is to be inserted, and asks the tokenizer 132 to recommend minimal changes to the token stream segment 138 that reflect the effects of the textual editing operation. In response, the tokenizer 132, which is a narrow expert in lexical analysis, knowing nothing of the insertion point 157, visual whitespace, or cursor behavior, performs an incremental lexical analysis on the token stream segment 138 by inserting the new character into the textual equivalent of the token stream (treating all separators as spaces) in the place indicated by the keystroke executive 130, and then analyzing the result as if it were text. Because the tokenizer 132 tries to make minimal changes to the token stream 138, in most situations changes to the token stream will not go beyond the token to the right of the insertion point. The tokenizer 132 then returns its suggested token stream update 138' to the keystroke executive 130. It must also return the position of the inserted character relative to the suggested update to the token stream segment 138' so that the keystroke executive 130 can update the insertion point appropriately.

When the editing action is a delete, the keystroke executive 130 identifies the editable element in the token stream segment 138 the user wants to delete and asks the tokenizer 132, "if this element were to be deleted, how should the token stream segment 138 be updated?" As in the case of an insertion, the tokenizer 132 computes the minimal change to the token stream segment 138 and returns its suggested update and the offset of the deleted character relative to the suggested update to the token stream segment 138' to the keystroke executive 130.

The keystroke executive 130 is then free to accept or reject the suggestion based on higher level information to which only it has access. The keystroke executive 130 then applies the suggested update 138' back to the token stream 158 and updates the insertion point 157.

As an example of case where the keystroke executive 130 rejects the suggestion of the tokenizer 132 assume that a user about to create a comment has just typed the first character of a C-style comment beginning delimiter (i.e., "/"). The keystroke executive 130 passes this keystroke to tokenizer 132, which concludes that this keystroke is a C division token; therefore it suggests that the keystroke executive 130 replace the token stream segment 138 with an updated token segment 138' including the new division token. At this point, the keystroke executive 130 has no way of knowing that the user is typing a comment; therefore, it accepts the tokenizer's suggestion. Now assume that the user has just typed the second character of the comment beginning delimiter (i.e., "*"), which would look to an ordinary lexer like a C multiplication token. In the preferred embodiment of the present invention, the tokenizer 132 using extended lexical analysis rules is aware that it should join these two tokens together to form a special token ("/*") that is not in the language, This causes no confusion because neither C nor C++ allow a division token to be meaningfully adjacent to a multiplication token. Thus, the tokenizer 132 suggests that the keystroke executive update the token stream 158 by replacing the division token "/" with the special token "/*". However, and this is an area that will be covered in depth later, a basic tenet of the editor 122 is that comments and any other non-program information be kept separate from the token stream 158, simplifying lexical analysis of the program 124. Consequently, the keystroke executive 130 rejects the replace suggestion made by the tokenizer 132 and instead deletes the "/" from the token stream 158 and calls the comment processor 136 to create a new comment. This commenting process is described in greater detail in a related application by the same inventor, "Token-Based Computer Program Editor with Program Comment Management," Ser. No. 08/499,088.

Having generally described how the tokenizer 132 and the keystroke executive 130 cooperate to incrementally update the token stream representation 158 of a computer program being edited, further details of the tokenizer's preferred structure and method of operation will now be set out.

D. Tokenizer/Lexer Implementation

In the preferred embodiment, the Tokenizer 132 and the objects with which it interacts are units of an object-oriented system. As is well known, object-oriented systems provide a set of inter-related classes, each of which can specify methods and data structures associated with objects that are instances of that particular class. Classes can also have subclasses, which inherit the data structures and methods of one or more parent classes and which can include additional data structures and methods specific to the subclass. Additionally, object instances of one class can encapsulate, or "wrap" objects of another class so as to provide a seamless external interface to the wrapped object. For example, a wrapper object could act as an intermediary between a design program and a graphics object storing graphical data that is incomprehensible to the design program. Such a wrapper object would provide methods on the graphics object that translate the graphical data to a form that is compatible with the design program.

Figure 4:
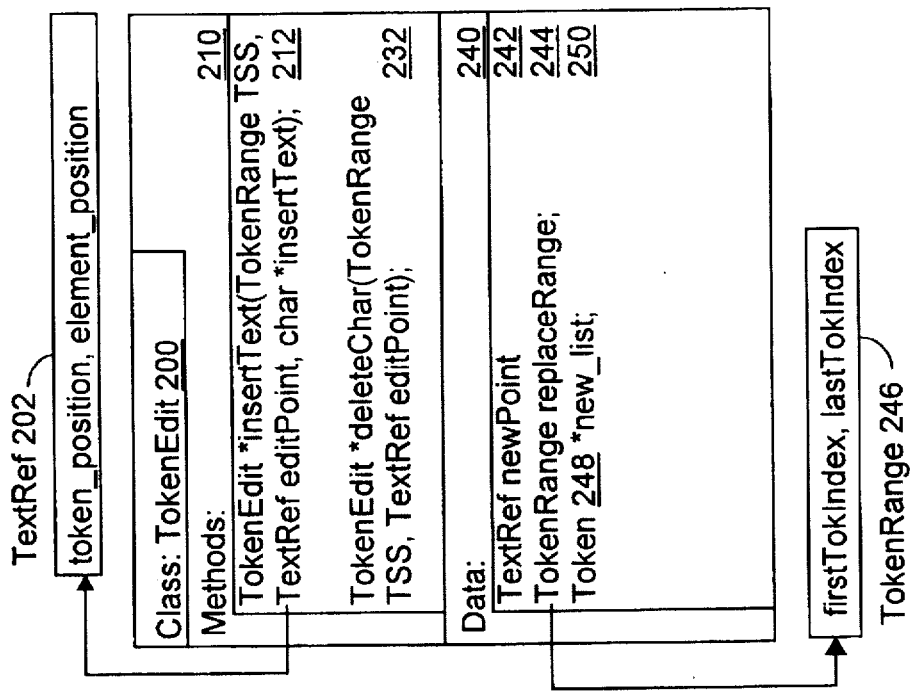
FIG. 4 is a block diagram of the classes that compose the tokenizer of the preferred embodiment.

FIG. 4 shows six classes that cooperatively compute a token stream update while performing minimal lexical analysis. These classes, which include TokenEdit 200, IncrLexemeStream 300, InsTextTokenIstream 310, DelCharTokenIstream 320, LexicalAnalyzer 330 and TokenIstream 340, are now briefly described.

The TokenEdit class 200 provides a set of methods that compose the Tokenizer 132 functions described above and the data structures used by those methods to return a suggested update to the token stream segment 138' to the keystroke executive 130 following an input event. The IncrLexemeStream class 300 encapsulates a text stream and lexically analyzes (using a batch lexer, such as "Lex", encapsulated by the LexicalAnalyzer class 330) the wrapped text stream.

The TokenIsteam class 340 encapsulates a TokenRange structure (a sequence of tokens, for example, the token stream segment 138) and permits the TokenRange to be read, one character at a time using the method get__char( ) 342.1, as if the TokenRange were a simple text stream. The classes InsTextTokenIstream 310 and DelCharTokenIstream 320 are subclasses of the TokenIstream class 340, and each specializes the behavior of class TokenIstream 340 by permitting a single (per instance) textual change (insertion or deletion respectively) to be applied to the textual equivalent of the TokenRange. Thus, a client that creates an instance of class InsTextTokenIstream 310 and then reads the text stream produced by method get__char( ) 312.1 does not see the exact textual equivalent of the encapsulated TokenRange, but instead sees the textual equivalent after it has been modified by the insertion of text at a particular location (both specified when the instance of InsTextTokenIstream is created).

Taken together, the classes shown in FIG. 4 enable a conventional batch lexer to be invoked on a token stream segment 138 wrapped by one of the "istream" classes 310, 320. These classes also allow the resulting tokens to be returned to the keystroke executive 130 as a suggested update to the token stream segment 138' including an updated insertion point. Thus, the present invention makes possible the use of existing, text-oriented batch lexers to perform incremental lexical analysis on data streams with which they would otherwise be completely incompatible. Before the classes are described in depth, their initialization and interactions following an insertion event are described in reference to FIGS. 5A and 5B.

Figure 5A:
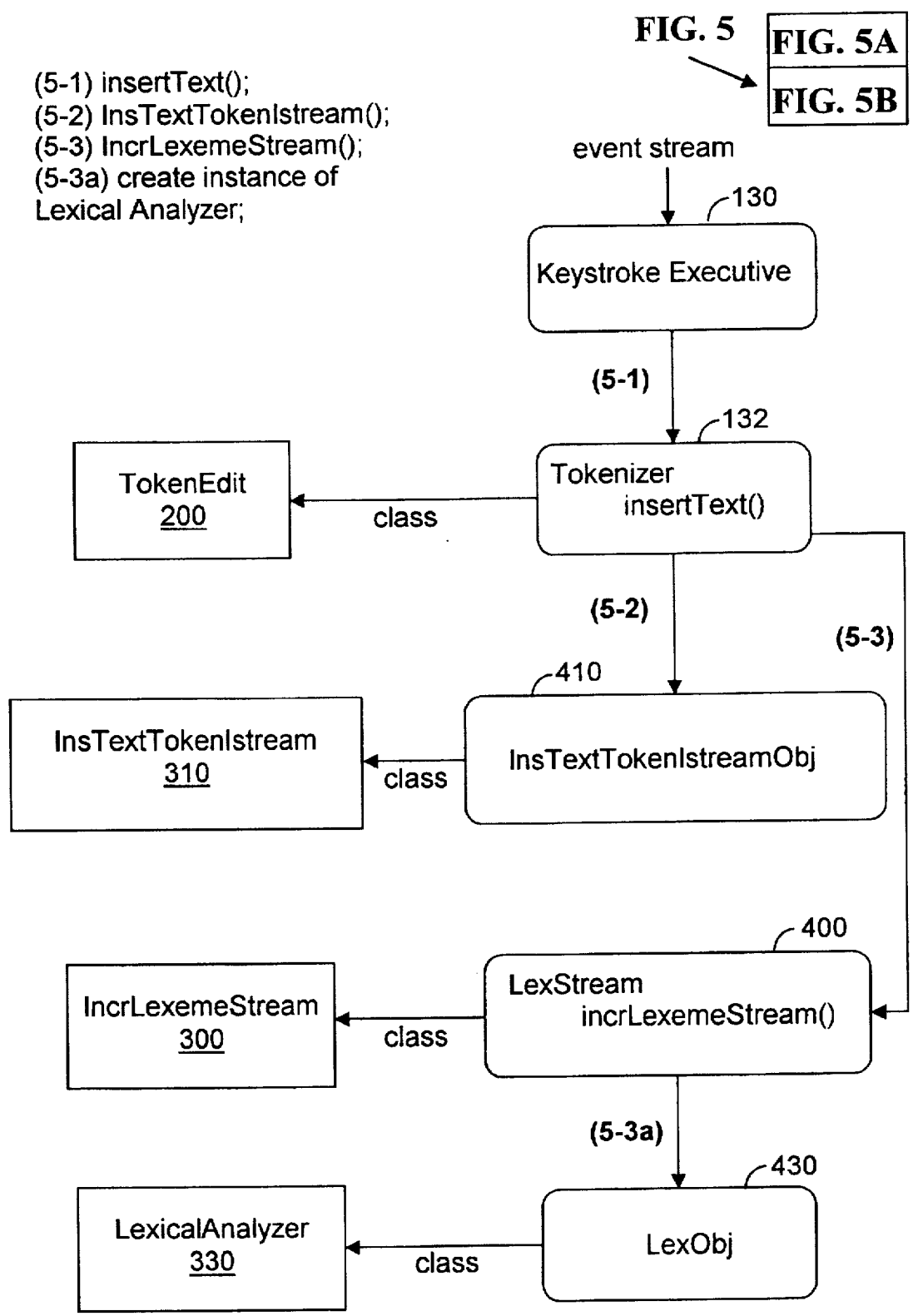
FIG. 5 is a process flow diagram showing the steps by which the keystroke executive creates object instances of the classes shown in FIG. 4 following an input event.

Referring to FIG. 5A, there is shown is a process flow diagram illustrating the steps by which object instances of the classes shown in FIG. 4 are created and initialized following an input event. In this and subsequent figures, objects are shown as boxes with rounded corners, and classes and data are shown as boxes with squared corners.

Messages passing between objects or actions performed by one object on another object are indicated by arrows whose direction shows the direction of the method or action. In most cases, the arrows are labelled with an index, such as "(5-0)", associated with a particular message.

Input events 113 are received by the editor's keystroke executive 130, which dispatches those events according to category. In most cases, the keystroke executive 130 creates a TokenEdit object 132 by calling the method TokenEdit::insertText( ) 212 (in the case of an insertion event) or the TokenEdit::deleteChar( ) method 232 (in the case of a deletion) (5-1). Due to the similarity in the way insertions and deletions are handled by the present invention, the rest of this description assumes that the keystroke executive 130 called the insertText( ) method 212.

The insertText( ) method 21 2 creates an instance (InsTextTokenIstreamObj 410) of class InsTextTokenIstream 310 by issuing (5-2) an InsTextTokenIstream message to the class 310. An InsTextTokenIstreamObj 410 produces on demand (lazily) a stream of characters that represent the hypothetical text stream, called "new text."

Once the InsTextTokenIstreamObj 410 has been instantiated, the insertText( ) method 212 issues an IncrLexemeStream message (5-3) to the IncrLexemeClass 300, resulting in the creation of an object instance ("LexStream") 400 of the class IncrLexemeStream 300. An IncrLexemeStream object 400 produces on demand (lazily) a stream of new tokens that represents the hypothetical state of the token stream after the desired insertion (deletion) has been made. In this case, the LexStream object 400 is initialized to produce the new token stream from the "virtual text stream" produced by the InsTextTokenIstreamObj 410. In turn, the LexStream object 400 creates an object instance (LexObj) 430 of the Lexical Analyzer class 330, which encapsulates the extended batch lexer that will actually generate the lexemes returned by the LexStream object 430 (5-3a).

Figure 5B:
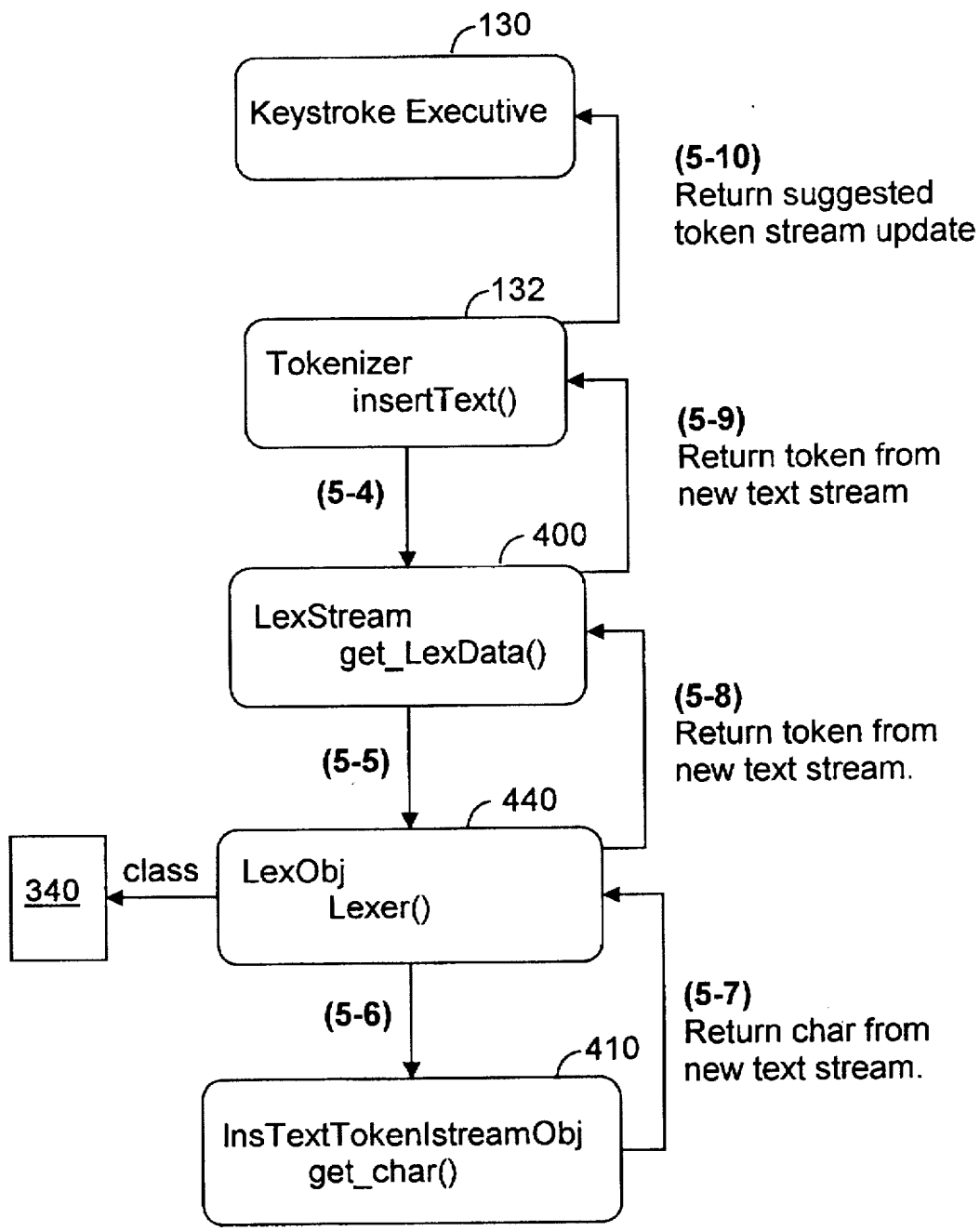

Referring to FIG. 5B, there is shown a flow chart illustrating the post-initialization interactions of the objects described in reference to FIG. 5A as they incrementally compute the token stream modification of a computer program following an input event.

Following the initialization steps (5-1), (5-2), (5-3) and (5-3a), the tokenizer method TokenEdit::insertText( ) 212 (or, in the case of a deletion event, TokenEdit::deleteChar( ) 232) enters a synchronization loop that compares the existing token stream segment 138 with the hypothetical token stream produced by the IncrLexemeStreamObj 410. This loop calls (5-4) the get_LexData( ) method 302.1, whose function is to return (5-9) the next token from the new token stream. The get$_{13}$ LexData( ) method 302.1 accomplishes this by invoking (5-5) the Lexer( ) method 332.1 of the LexStream object 430, whose role is to lexically analyze the textual equivalent of the new token stream and return token information (5-8) for the next token. The Lexer 332.1 obtains the textual basis for the new token stream one character at a time from the get_char( ) method 312.1 of the InsTextTokenIstreamObj 410. Each time it is invoked (5-6), the get_char( ) method 312.1 returns (5-7) the next character of the new text stream, including any inserted characters, in the appropriate order.

Based on the new tokens received (5-9) from the LexStream object 400 and the old tokens in the token stream segment 138, the insertText( ) method 212 computes the minimum token-based changes necessary to update the current token stream 138 and returns (5-10) information about the change to the keystroke executive 130, which decides whether to make the change. Importantly, the tokenizer 132 takes care to compute where, relative to the hypothetical new token stream, the inserted (deleted) character is (was); this information is used by the keystroke executive 130 to place the insertion point after it carries out the change.

The classes are now described in detail in reference to FIG. 4.

TextRef and TokenRange Classes 202, 246

An aspect of the present invention that is central to the operation of the classes shown in FIG. 4 is the way the present invention represents text coordinates, token positions in the token stream 158, ranges of tokens (such as a token stream segment 138), and the location of the insertion point 157 within or between tokens.

Text Coordinates

Text coordinates are conventional. A text location is the position between two adjacent characters in a text stream, represented as an integer index from 0 through M, where the stream contains M characters. The value of the index corresponds to the number of characters to the left of the position. Thus, the beginning of a stream is position 0, and the end is position M. In the present invention, text streams are generated as textual equivalents of the token stream segment 138 before and after the the current editing event.

The character at a particular position is the character (if any) to the immediate right of the designated position. Thus, the first character in a text stream is at position 0, the last is at position M-1, and there is no character at position M.

Token Coordinates

A simple token location is the position between two adjacent tokens in a a token stream (e.g., the token stream 158), represented as an integer index from 0 through N, where the stream contains N tokens. The value of the index corresponds to the number of tokens to the left of the position. Thus, the beginning of a token stream is position 0, and the end is position N.

The token at a particular position is the token (if any) to the immediate right of the designated position. Thus, the first token in a stream is at position 0, the last is at position N-1, and there is no token at position N.

Token Ranges

A token range (expressed in the present invention as the type "TokenRange" 246) is a pair of simple token coordinates (a,b), where 0<=a<=b<=N, that identifies the possibly empty sub-sequence of 5 tokens in a stream between the two positions. In the preferred embodiment, the coordinate "a" is referred to as "firstTokIndex" and the coordinate "b" as "lastTokIndex". Thus, token range (0,1) includes exactly one token, the first in the sequence, and the range (1,3) contains two tokens. The range (0,0) is empty. The range (1,1) is also empty, although at a different position. The range (0,N) contains the entire stream. Note that a token range does not contain tokens but simply holds references to tokens.

Edit Points

An editing point, or simply "point", (expressed in the present invention as type "TextRef" 202) is a pair consisting of a simple token location ("token_position") and a text location ("element_position"). The text location refers to a position in the text contained by the token at the token location. Thus, point (0,0) is just before the first character of the first token, and the point (0,1) is just after the first character of the first token. Point (0,M), where the first token contains M characters, is immediately after the final character of the first token.

When there is no separator present at a token position, the following two points are logically equivalent and indistinguishable to a user:

(n,m) at end of token n, which contains m characters, and (n+1,0) at beginning of token n+1.

TokenEdit Class 200

Referring to FIG. 4, the tokenizer 132 is implemented by the TokenEdit class 200, which incorporates data structures 240 and methods 210 that pertain to high-level tokenizer functions. The methods 210 include insertText( ) 212 and deleteChar( ) 232. Each of the methods 210 allows the tokenizer 132 to compute the minimal incremental change (i.e., the suggested update 138') to the token stream segment 138 that carries out the current editing operation from the event stream 113. These methods are called by the keystroke executive 130 with appropriate arguments as dictated by the editing situation, and each call returns a new instance of TokenEdit that represents the suggested change 138'.

For example, when the event stream 113 produces a text insertion operation, the keystroke executive 130 calls the Tokenizer's insertText( ) method 212 with a pointer to the inserted text 113 ("insertText"), the current token stream segment 138 ("TSS"), represented as a TokenRange structure 246, and an instance of the TextRef structure 202 ("editPoint"), which includes the token_position 157a and the element_position 157c from the insertion point data structure 157. Similarly, when the event stream 113 produces a character deletion operation, the keystroke executive 130 calls the Tokenizer's deleteChar( ) method 232 with the edit point and TSS arguments. As the operation of the deleteChar method( ) 232 differs from that of the insertText( ) method 212 in only a few details that are readily inferred from the inherent differences between text insertion and character deletion, the remainder of this discussion will focus on the operation of the insertText( ) method 212.

Once called, the appropriate tokenizer method 210 (i.e., insertText( ) 212 or deleteChar( ) 232) computes, with the assistance of methods and data encompassed by the IncrLexemeStream class 300, a suggested update to the token stream segment 138' that represents a minimal update to the token stream segment 138 consistent with the editing action and the editPoint passed by the keystroke executive 130. The suggested update 138' is represented by data stored in a new instance 132 of class TokenEdit, including newPoint 242, replaceRange 244 and the list of new tokens 250, which together define the tokenizer's suggested update to the token stream segment 138 in such a way that the keystroke executive 130 can (1) replace existing tokens in the token stream 158 with new tokens that reflect the editing action and (2) correctly update the insertion point 157. The keystroke executive 130 accesses the updated token stream information by accessing the pointer to the TokenEdit object instance that is returned by the called tokenizer method.

The replaceRange 244 specifies a range of tokens in the token stream 158 that is suggested to be replaced. As shown in FIG. 4, the replaceRange 244 is a structure of the type TokenRange 246. The new tokens suggested to replace the tokens specified in the replaceRange 244 are included in a list of tokens called new list 250. As with tokens in the token stream 158, a token in the new list 250 is an instance of a token class 248 that specifies a token's stream_position 248.1, content 248.2, lexical class 248.3 and, optionally, a provisional separator bit 248.4. The newPoint structure 242 stores the location of the textual change that led to the suggested update 138'. This location is stored as coordinates that become meaningful relative to the token stream 158 after the suggested update is actually performed. The newPoint structure 242 is an instance of the TextRef class 202. Consequently, the newPoint 242 structure has two elements:

(1) newPoint.token_position (token position of the inserted text relative to the token stream 158 after the change is made); and (2) newPoint.element_position (an offset from the beginning of the token indicated in the token_position) that identifies the position to the right of the inserted text.

The InsertText( ) method 212 computes the minimal update by comparing the existing token stream segment 138 before the change with a hypothetical token stream that reflects the result of the text insertion. In order to do this, the comparison conceptually operates over 4 different streams of: old tokens (the token stream segment 138), old text, new text, and new tokens. These streams are related by the following conceptual transformations:

1. old tokens to old text: convert old tokens to a text stream, translating separators to "strong" whitespace characters that preserve lexical boundaries;

2. old text to new text: insert text at point; and 3. new text to new tokens: conventional lexical analysis.

These transformations are implemented lazily in order to minimize computation, meaning that the newly created streams are never represented fully but are instead computed in small pieces on demand, as needed by the comparison loop.

The insertText( ) method 212 sets up this comparison by first invoking the InsTextTokenIstream( ) method 312.2 of the InsTextTokenIstream class, giving the method as arguments the old token stream 138, the text to be inserted, and the point at which it should be inserted. This creates an instance InsTextTokenIstreamObj 410 that produces the "new text" stream, which can be read a character at a time using its get char( ) method 312.1. The insertText( ) method 21 2 then invokes the IncrLexemeStream( ) method 302.2 of the IncrLexemeStream class, giving it as an argument the newly created "new text" stream. This creates an instance, LexStream 400, of the IncrLexemeStream class 300, that produces the "new token" stream. The new token stream can be examined one lexeme at a time by invoking its get LexData( ) method 302.1, which returns the next token in the new token stream each time it is executed.

The insertText( ) method 212 then compares the existing token stream segment 138 with the new tokens produced by repeatedly invoking the get_lexData( ) method 302.1 until it is able to discern no further difference between the two token streams. At that point, the insertText( ) method 212 returns the information describing the suggested update 138'. The operations of the get_lexData( ) and IncrLexemeStream( ) methods 302.1, 302.2 and the methods of the "istream" and LexicalAnalyzer classes 310, 320, 330, 340 that cooperate with the methods 302.1,302.2 are now described.

IncrLexemeStream and Lexical Analyzer Classes 300, 330

The IncrLexemeStream class 300 and Lexical Analyzer class 330 lexically analyze the hypothetical new text stream and generates a sequence of "new tokens" that is intelligible to the keystroke executive 130 and compatible with the existing token stream 158.

The IncrLexemeStream class 300 has methods 302 that include get_lexData( ) 302.1 and IncrLexemeStream( ) 302.2. The get_lexData( ) method 302.1 is called by the insertText( ) method 212 whenever it needs another token from the "new token" stream. In response, the get_lexData( ) method 302.1 calls the Lexer( ) method 332.1 of the Lexical Analyzer class 330, which produces, in cooperation with the get_char( ) method 312.1 of the InsTextTokenIstream class 310, the next token. The get_lexData( ) method 302.1 returns to the calling tokenizer method 210 (e.g., insertText( ) 212) three pieces of data:

"lVal" the lexical class of the returned token,

"tokLength" the number of characters in the token, and

"tokText", a pointer to the characters composing the token.

As described in reference to FIG. 5A the IncrLexemeStream( ) method 302.2, which is a constructor for the class IncrLexemeStream 302, is called by insertText( ) 212 at the beginning of every editing operation to create and initialize an object instance of the class IncrLexemeStream 300. Once created, the instance of the class IncrLexemeStream 300 subsequently executes all get_lexData messages from the insertText( ) method 212. The IncrLexemeStream( ) method 302.2 also sets up an instance of the LexicalAnalyzer class 330 that lexically analyzes the text stream.

The Lexical Analyzer class 330 encapsulates a conventional batch lexer ("lex" in this case) whose tables 168a are computed offline (as part of the construction of the program) from a description of the lexical rules of the language to be analyzed. The tables 168a-2 in this case are derived from descriptions that are extended in two significant ways from common practice. First, the lexical rules of the language are expanded to recognize and categorize appropriately the incomplete and illegal tokens that can be formed as a user of the editor writes and modifies a program. Second, the rules of the language are extended so that whitespace characters, instead of being ignored as is customary, are analyzed and reported as quasi-tokens (not part of the language proper). This lexer is represented in FIG. 4 as the Lexer( ) method 332.1. Data 334 used by the Lexer( ) method 332.1 is also encapsulated in the LexicalAnalyzer class 330. Thus, the lexeme_table 168a-2 is also included in the class 330. The Lexer( ) 332.1 reads from a text stream that is generated one character at a time by one of the "istream" methods, which include TokenIstream, InsTextTokenIstream and DelCharTokenIstream. These classes are now described.

"Istream" Base Class 340 (TokenIstream)

The TokenIstream class 340 encapsulates a TokenRange structure (a sequence of tokens, for example, the token stream segment 138) and uses the lexical rules of the language to permit the tokens identified by the TokenRange to be read, one character at a time, using method get_char( ) 342.1, exactly as if the TokenRange were a simple text stream. The class TokenIstream is a subclass of the "istream" class supplied with standard C++ implementations, and by re-implementing appropriate virtual functions such as get_char( ) is able to produce a text stream in a form suitable for textual input to the conventional batch lexer encapsulated by the LexicalAnalyzer class 330.

The implementation is lazy, computing the text stream only on demand. Method get_char( ) 342.1 in most cases simply returns the next unseen character of the token currently being read. When the last character of a token is reached, however, the separator table for the language 168a-1 is consulted to decide what character will be returned next. If there is no separator present between the current token and its successor, then the first character of the following token will be returned next. If there is a separator present, then a designated separator substitute character is returned next, followed by the first character of the following token. The separator substitute character could be a simple space character but, for the purposes of the present invention, it is a character (a newline character in conventional language) that will preserve the lexical boundary in certain unusual situations where a space might not.

Figure 6A:
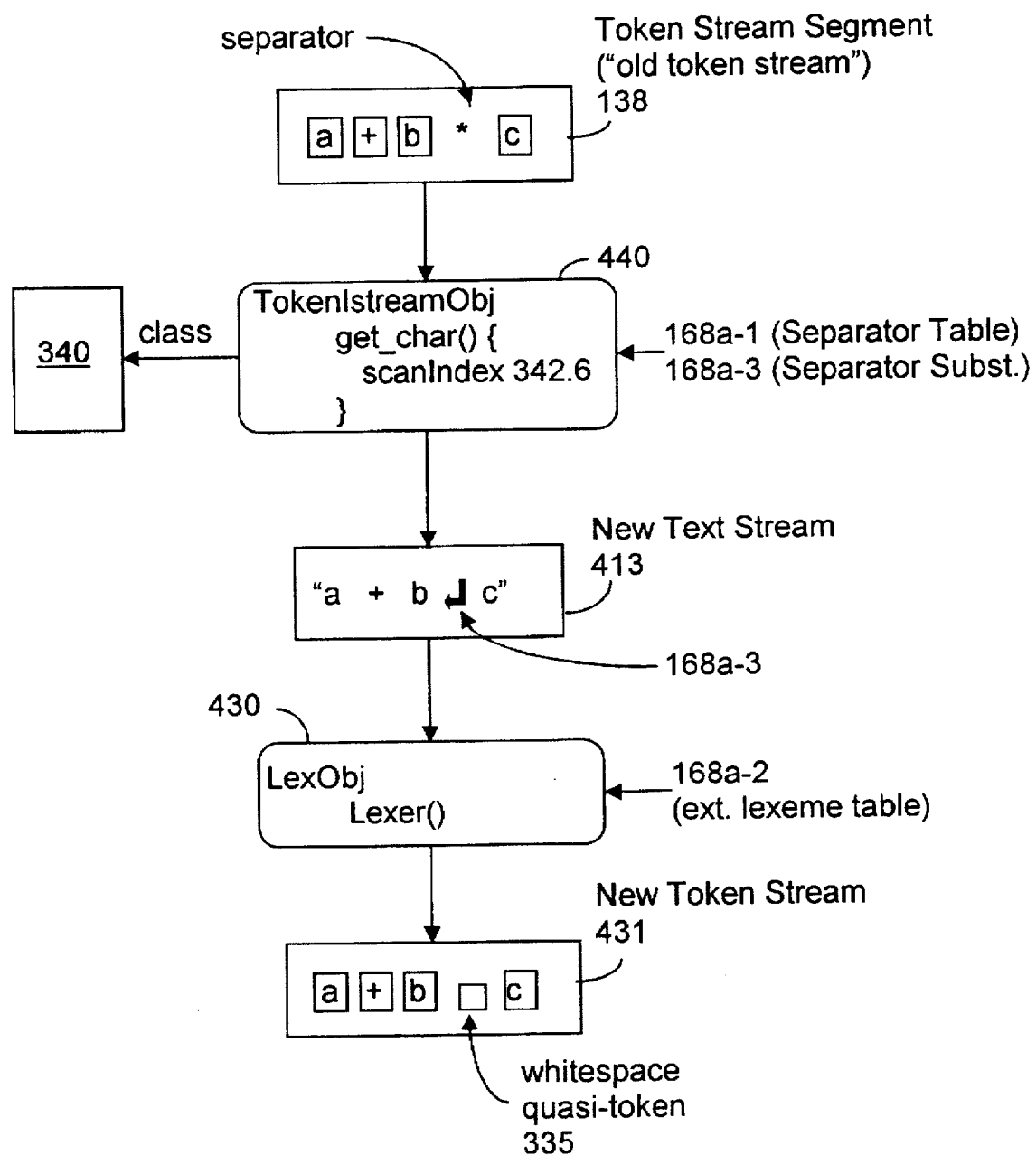
FIG. 6A is a flow diagram illustrating the operations of the get_char( ) method of the TokenIstream class and the Lexer( ) method of the LexicalAnalyzer class for a null input event.

FIG. 6A represents an instructive example of how the TokenIstream class 340 can be combined with the Lexical Analyzer class 330 to translate a sequence of tokens to text and then back into tokens. In this instructive example, where the contents of the token stream are not being modified, the output will be equivalent to the input. In this and subsequent figures objects are represented by boxes with rounded corners and the data they interact with are represented by boxes with square corners. In FIG. 6A, the input token stream segment 138 consists of four tokens, "a", "+" "b" and "c". Because the boundary between the tokens "b" and "c" is ambiguous, that boundary includes a separator, shown as an asterisk, "*". As described above, the separator "*" is not actually present in the token stream segment 138 but is inferred by the get_char( ) method 342.1 based on the classes of the tokens on either side of a token boundary and information in the separator table 168a-1 (see FIG. 3).

In response to repeated get_char( ) calls to a TokenIstreamObj 440 the get_char( ) method 342.1 outputs (one character at a time) a text stream 413 that comprises the text: "a+b←c". The symbol "←" in the text stream 413 represents a language-specific, separator substitution character ("substChar") 168-a3, which is inserted by the TokenIstreamObj 440 into the text stream whenever a separator "*" is encountered in the token stream segment 138. For example, in the preferred embodiment, which is directed to an editor for C++ programs, the substChar 168-a3 could be a space for ordinary conditions but, in order to deal with unusual situations, is a newline character.

The presence of the substChar 168-a3 ensures that the Lexer( ) 332.1 stops scanning the text stream 413 when it reaches a token boundary occupied by a separator, such as the boundary between the tokens "b" and "c". For example, in the preferred embodiment, the C++ batch lexer that is the core of the Lexer( ) 332.1 always stops scanning the text stream 413 when it encounters a newline character. Thus, instead of combining the two tokens "b" and "c" into a single token "bc" , the Lexer( ) 332.1 returns two separate tokens "b" and "c". Additionally, the Lexer( ) 332.1 emits a whitespace quasi token 335, denoted by the hollow box symbol "58 ", to mark the position of the separator substitution character in the new token stream. This whitespace quasi token 335 is not part of the language proper, but is returned by the Lexical Analyzer class 330 in order to permit accurate accounting of all characters seen by the Lexer.

As for the remainder of the text stream 413, because the lexical rules of C++ always imply a token boundary between arithmetic symbols (e.g., "+") and adjacent variables (e.g., "a" and "b"), the get_char( ) method 342.1 does not insert any separator substitute 168-3 between those characters.

Based on the text stream 413 and information in the extended lexeme table 168-a2, the Lexer( ) 332.1 is thus able to return a new token stream 431 that (with the exception of the whitespace quasi-token) is equivalent to the input token stream segment 138.

"Istream" classes 310, 320 (InsTextTokenIstream, DelCharTokenIstream)

The classes InsTextTokenIstream 310 and DelCharTokenIstream 320 are subclasses of the TokenIstream class 340 and inherit the behavior described above. However, each specializes (alters) the behavior of class TokenIstream 340 by permitting a single, per-instance textual change (text insertion and deletion respectively) to be applied in the process of computing the text stream. Because the two subclasses perform similar functions, the emphasis in the following descriptions is on the InsTextTokenIstream class 310.

A client that creates an instance of class InsTextTokenIstream 310 and then reads the text stream produced by method get_char( ) 312.1 does not see the exact textual equivalent of the encapsulated TokenRange (as would be produced by an instance of class TokenIstream 340) but instead sees the textual equivalent after modification by the insertion of text at a particular location, both text and location having been specified when the instance of InsTextTokenIstream is created.

The InsTextTokenIstream class 310 includes two methods 312, get_char( ) 312.1 and InsTextTokenIstream( ) 312.2. The DelCharTokenIstream class 320 includes similar methods, get_char( ) 322.1 and DelCharTokenIstream( ) 322.2, whose respective behavior is inferable from the following descriptions of the methods 312.1 and 312.2. The DelCharTokenIstream class 320 includes data 324 which, except for lacking an analogue to the insertText variable 314.3, are similar to the data 314 for the InsTextTokenIstream class 310. The data 324 do not include an analogue to the insertText variable 314.3 as the DelCharTokenIstream class 320 does not handle text insertions, only deletions.

The InsTextTokenIstream( ) method 312.2, which is the constructor for the InsTextTokenIstream class 310, is called every time the IncrLexemeStream( ) method 302.2 is executed (this occurs every time an insertion event occurs). When executed, the InsTextTokenIstream( ) method 312.2 creates a new instance ("InsTextTokenIstreamObj") 410 of the class InsTextTokenIstream 310, which subsequently responds to all get_char( ) messages issued by the Lexer( ) method 332.1.

The get_char( ) method 312.1 is invoked by the Lexer( ) 332.1 every time it needs another character from the new text stream 413. Based on the character returned by get_char( ) 312, the Lexer( ) 332.1 either adds the character to a token being formed, which it reanalyzes, or, if the character completes a token, breaks off lexical analysis and returns a completed token. Data 314 used by the get_char( ) method 312.1 includes TSS 314.1 (corresponding to the token stream segment 138), editPoint 314.2, and insertText 314.3, which are passed by the insertText( ) method 212 when it initializes an InsTextTokenIstreamObj 410 (see FIG. 5A). The get_char( ) method 31 2.1 also has access to a separator substitute character (substChar) 168a-3 (see FIG. 6B), which is a character that acts as a language-specific lexical barrier, and a scanIndex 314.6 that holds the method's working position in the token stream segment 138. In addition to these InsTextTokenIstream data 314, the get_char( ) method also makes use of the token class information 158c of each token in the token stream segment 138 and the separator table 168a-1, which indicates, based on the classes of adjacent tokens and language rules, which adjacent tokens require a separator.

Each time it is called, the get_char( ) 312.1 method consults the aforementioned data and determines whether it needs to:

(1) return the next character from the textual equivalent of the token stream segment 138 (when the value of scanIndex 314.6 is not equivalent to editPoint 314.2 and is not between tokens whose boundary includes a separator);

(2) return insertText 314.3 (when the value of scanIndex 314.6 is equivalent to editPoint 314.2); and (3) return substChar 168a-3 (when the value of scanIndex 314.6 is between adjacent tokens whose boundary includes a separator).

Figure 6B:
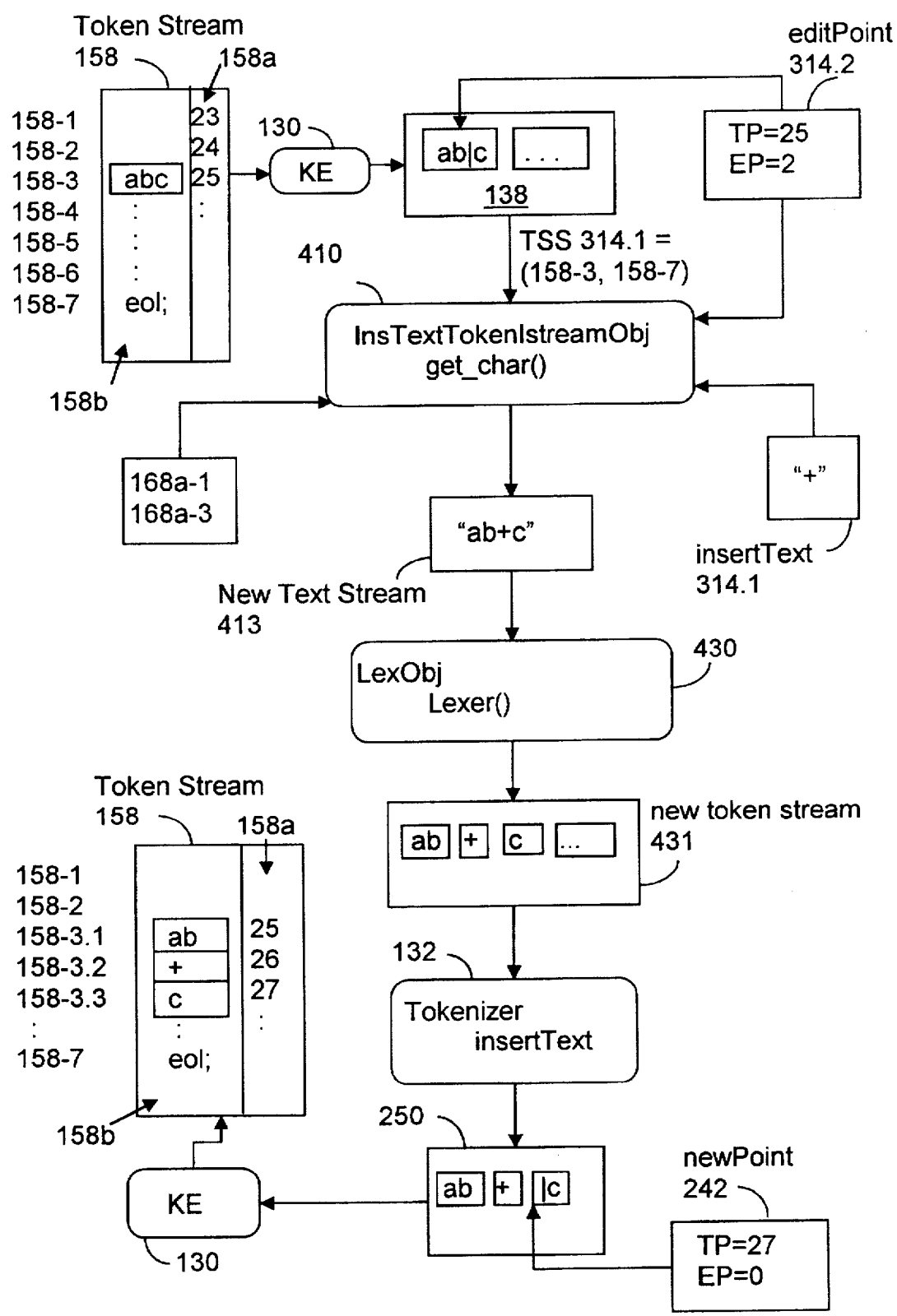
FIG. 6B is a data flow diagram illustrating the operations of the get_char( ) method of the InsTextTokenIstream class and the Lexer( ) method of the LexicalAnalyzer class for an insertion input event.

Referring to FIG. 6B, there is shown a data flow diagram that illustrates some of the steps by which the InsTextTokenIStreamObj 410 generates a text stream 413 ("new text") that reflects an insertion operation and which, when processed by the LexObj 430, results in a suggested update 138' that represents the minimum change to the token stream segment 138 consistent with the insertion. Specifically, in the example of FIG. 6B, an insertion event has just occurred in which a user has placed the cursor (represented in FIG. 6B with the symbol "?") between the "b" and "c" of the token 158-3 ("abc") and typed a "+" symbol. Reflecting this input event, the keystroke executive 130 sets the insertText 314.3 to "+", generates a token stream segment 138 specifying the tokens from the leftmost token touching the insertion point (i.e., the token 158-3) through the end of the line 158-7 and sets editPoint.token_position ("TP") to the token position of the first token of the token stream segment 138 and editPoint.element_position ("EP") to 2, indicating that, within the token indicated by "TP", exactly two characters are to the left of the insertion point. This information is provided to the insertText( ) method 212 (not shown in FIG. 6B), which uses the information to initialize an InsTextTokenIstreamObj 410. The object instance 410 also has access to the separator table 168a-1 and the substChar 168-a3. Note that the token stream segment 138 is actually passed to the InsTextTokenIstreamObj 410 as a TokenRange specifying the tokens contained in the segment.

Based on these data, in the course of repeated get_char( ) calls from the LexObj 430, the get_char( ) method 312.1 constructs the text stream 413, "ab+c", the new text that reflects the current insertion. Note that the get_char( ) method 312.1 does not insert any substChars 168-a3 in this text stream 413 as there were no separators in the original token stream segment 138. Based on this text stream 413, the LexObj 430 constructs the new token steam 431 that includes three new tokens: "ab", "+" and "c" and the other tokens from the token stream segment 138 (represented as with the ellipsis ". . . ").

Using a process described below in reference to FIG. 7, the insertText( ) method 212 observes that no further changes are necessary and sets newPoint 242 at the beginning of the "c" token, the position immediately following the newly inserted text (this position is equivalent to the end of the "+" token, since there is no separator present). As with all other instances of an editPoint, the newPoint is represented as a coordinate pair. In this case the coordinates are "(27, 0)", where the token position 27 refers to the location that will be occupied by new token "c" in the token stream 158 if the change is actually made; this information enables the keystroke executive 130 to place the insertion point properly in the modified token stream.

The insertText( ) method 212 returns to the keystroke executive 130 the resulting suggested update 138', which includes three data members in the TokenEdit instance corresponding to the editing action. The first data item is the newPoint 242, which is "(27, 0)" as described above. The second data item is a replaceRange 244 that indicates which tokens of the token stream 158 are to be replaced, which in the example of FIG. 6B would be the range "(25,26)" that includes the single token "abc". The third is a list of new tokens to be inserted 250, which in the example would contain the three new tokens "ab", "+" and "c".

Assuming the keystroke executive 130 decides to accept the suggested update 138', it would produce the updated token stream segment 158' where the original token 158-3 ("abc") has been replaced with tokens 158-3.1 ("ab"), 158-3.2 ("+") and 158-3.3 ("c"). The operations of the insertText( ) method 212 are now described with reference to FIGS. 7 and 8.

Figure 7:
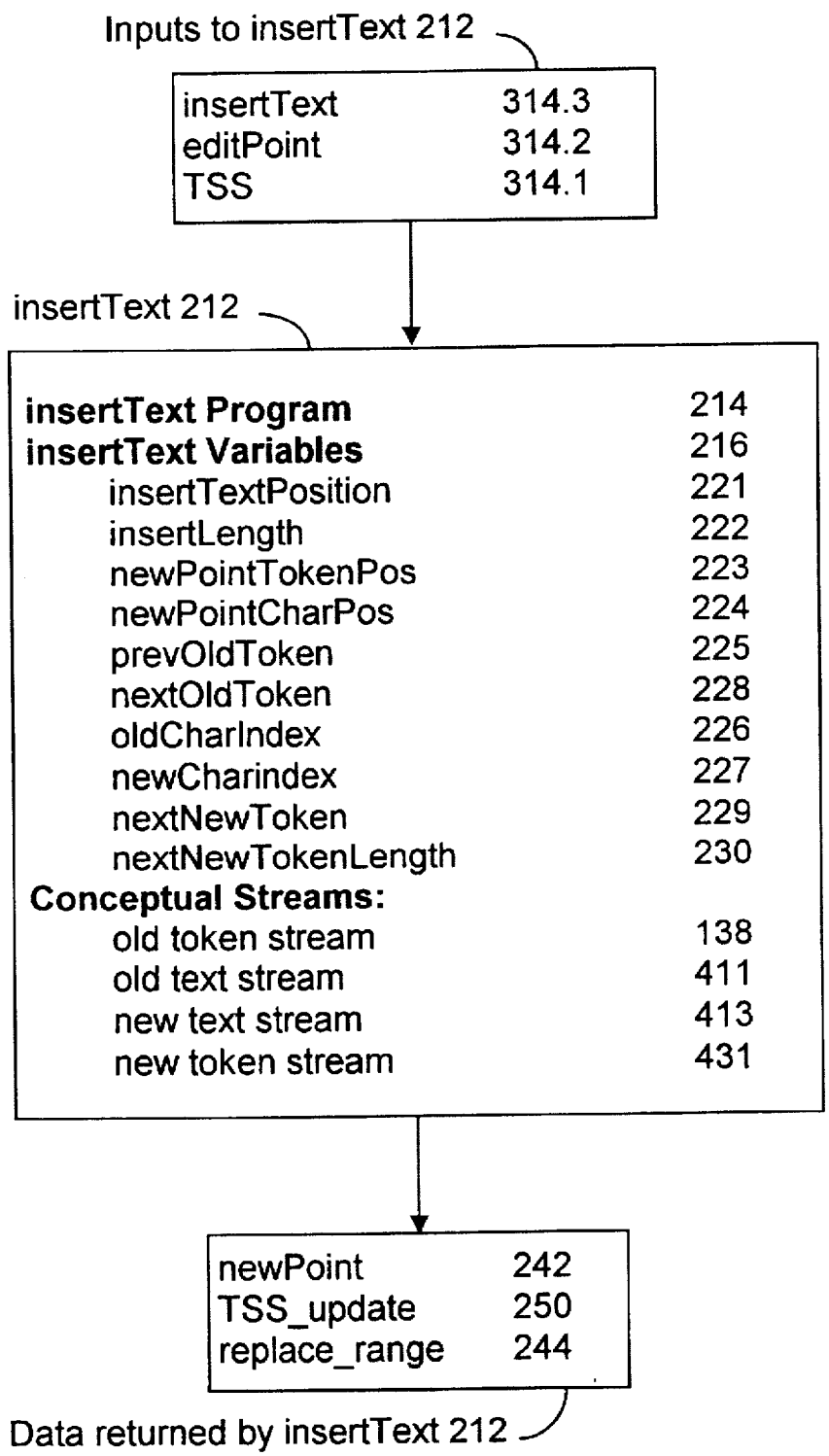
FIG. 7 is a block diagram of the insertText( ) method 212 of the present invention.

Referring to FIG. 7, there is shown a block diagram of the insertText( ) method 212, which includes an insertText program 214, which actually implements that actions ascribed herein to the insertText( ) method 212, and insertText variables 216. As already described in reference to FIG. 4, the insertText( ) method 212 takes as inputs the token stream segment ("TSS") 138, the editPoint 314.2 and the insertText 314.3. Based on these inputs, the insertText( ) method 212 computes:

1. the range (replaceRange 244) of tokens in the token stream segment 158 to be replaced with tokens returned by the Lexer( ) 332.1, 2. a list (new_list 250) of the new replacement tokens 248, and 3. the location (newPoint 242) just after the inserted text expressed in coordinates that are meaningful after the suggested updated 138' is made to the token stream 158.

The insertText( ) method 212 accomplishes this by performing a parallel walk over the old token stream (the token stream segment 138 before the insertion) and the new token stream 431 generated by the Lexer( ) method 332.1 from the text stream 413, recording details of the needed changes and stopping when no further change is needed. This requires the insertText( ) method 212 to operate conceptually over four different streams:

1. old tokens (the token stream segment 138), 2. old text 411 (the textual equivalent of the token stream segment 138, which is implicitly generated by the get_char( ) methods of the istream classes 310, 320, 340), 3. new text (the text stream 413 resulting from inserting the specified text into the old text stream 411), and 4. new tokens 431 (generated by the get_lexData( ) method 302.1, which lexically analyzes the new text stream 413).

The conceptual transformations performed on these streams by the insertText( ) method 212 and the methods it calls is are as follows:

1. old tokens 138>old text 411 (convert old tokens to conceptual text, translating separators to "strong" whitespace characters that preserve lexical boundaries);

2. old text 411>new text 413 (insert "insertText" at the "editPoint");

3. new text 413>new tokens 431 (lexically analyze the new text, counting whitespace).

In the preferred embodiment, these transformations are implemented lazily, meaning that they are computed on demand, token by token, as the insertText( ) method 212 walks the streams. The insertText( ) method 212 stops its parallel walk when it reaches a token boundary after the insertion point (editPoint) 314.2 where the (conceptually) same character is the first character of a token in both the old and new token streams 138, 431. From this point on there can be no further lexical effects of the textual editing operation.

The insertText( ) method 212 determines whether the stopping criterion for the parallel walk is met (i.e., reaching a token boundary after the editPoint 242 where the same character is the first character of tokens in both the old and new token streams) by counting characters in the conceptual old and new text streams, which differ only by the presence in the new text stream of the "insertText" 314.3. This requires the insertText( ) method 212 to maintain several internal variables 216 that it uses when comparing the old token stream 138 to the new token stream 431 returned by the Lexer( ) 332.1. These positional variables 216 include:

insertTextPosition 221 the offset in the first token of the TSS 314.1 where the insertText 314.3 should be inserted (this is the same as editPoint.element_position);

insertLength 222 the number of characters in insertText 314.3;

newPointTokenPos 223 the token that includes newPoint 242 (this variable is updated during the parallel walk and is used to set newPoint.token_position);

newPointCharPos 224 the number of characters in the token identified by newPointTokenPos 223 to the left of newPoint 242 (this variable is updated during the parallel walk and is used to set newPoint.element_position);

prevOldToken 225 the old token previously seen during the walk;

oldCharIndex 226 the number of characters walked so far in the old token stream (separators count as 1 character); and newCharIndex 227 the number of characters walked so far in the new token stream, including whitespace characters;

nextOldToken 228 the current old token being examined;

nextNewToken 229 the current new token being examined; and nextNewTokenLength 230 the length of the nextNewToken 229.

Note that each iteration of the insertText( ) method 212 described in reference to FIG. 7 walks over a single discrete chunk of either the old token stream 138 or new token stream 250, attempting to locate a position where the stopping condition holds. For the purpose of this loop, a chunk of the old token stream 138 can be either a token or a separator. A chunk of the new token stream 250 can be either a token or a whitespace quasi-token 335 returned by the lexer. The following are loop invariants (i.e., conditions that hold true at the beginning of the loop's body as long as the loop is being iterated):

1. The tokenRange replaceRange 244 includes those tokens in the old token stream 138 that have already been examined. If there is a separator between the last examined token and its successor, then the separator has been examined when prevOldToken 225 is NULL, otherwise it has not yet been examined;

2. Characters in the old text stream examined so far (0 through position oldCharIndex 226) correspond to a conversion of the old token stream examined so far (the tokens in replaceRange) to text, with each separator in the old token stream converted to a single whitespace character;

3. Characters in the new text stream (which is equivalent to the old text stream with new text inserted) examined so far (0 through position newCharIndex 227) correspond to characters that have been converted by the lexer to tokens, either ordinary tokens or quasi-tokens whose only role is to report whitespace seen by the lexer;

4. The list of tokens new list 250 includes all ordinary tokens that have been produced the by the lexer so far. It does not include the quasi-tokens whose only role is to report whitespace characters;

5. newPoint 242 is non-NULL if we have walked at least to the end of the newly inserted text; i.e., newCharIndex 227>=newPointCharPos 224; and 6. When newPoint 242 is non-NULL, it refers to the position just past the inserted text, represented in new token coordinates.

Figure 8A:
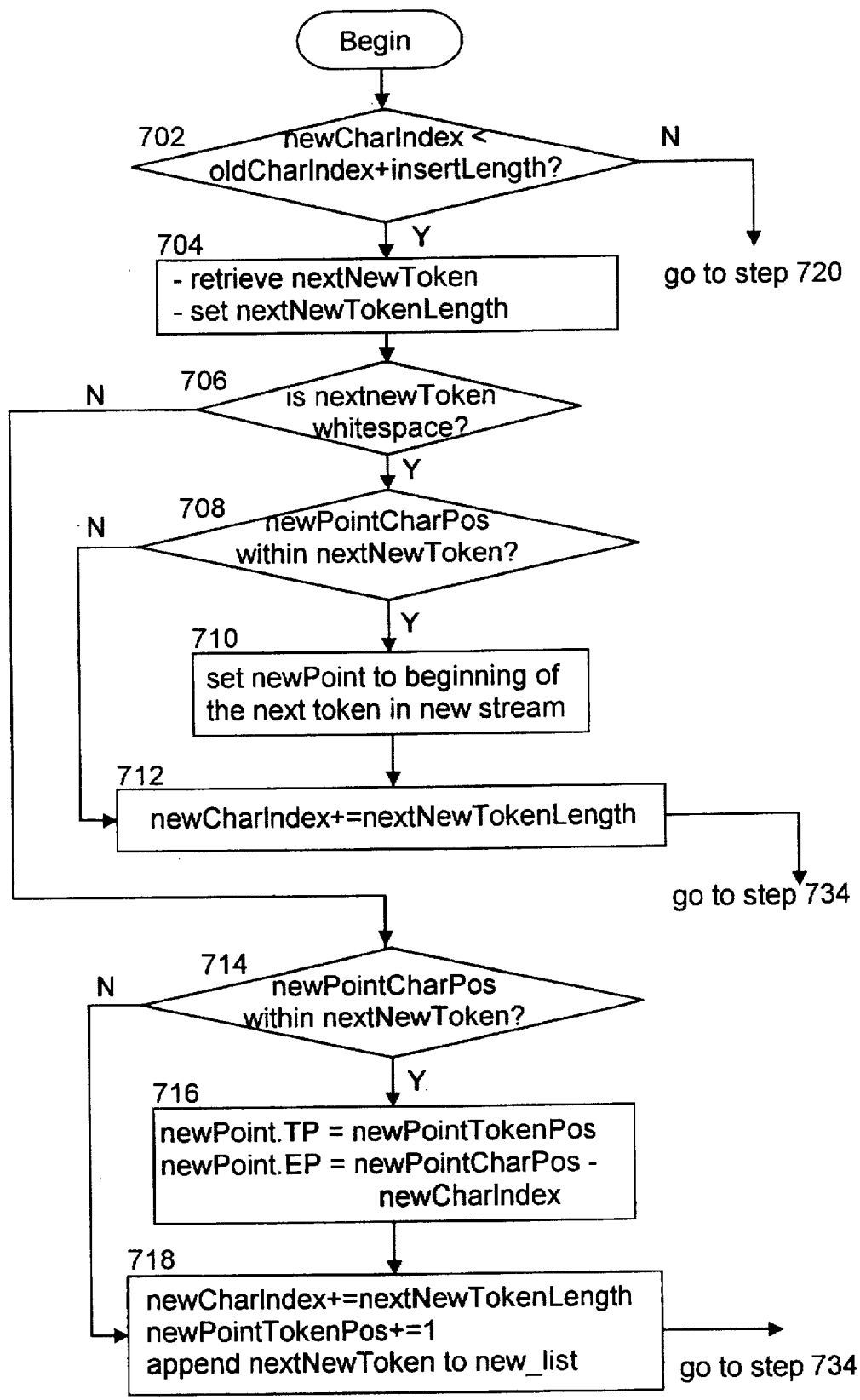
FIG. 8A is a flow chart of a subset of the insertText( ) method of the TokenEdit class of FIG. 4.
Figure 8B:
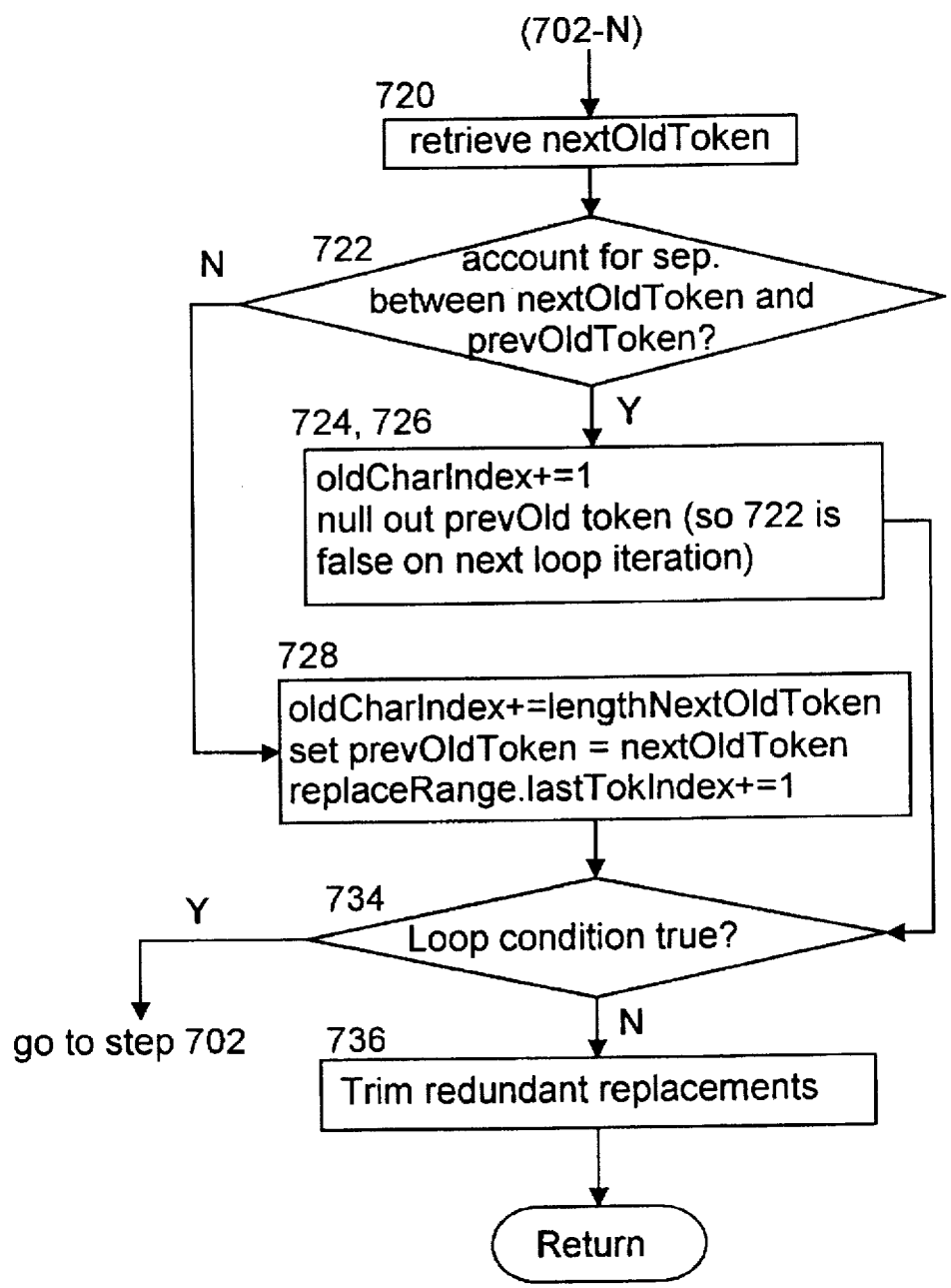
FIG. 8B is a flow chart of a subset of the insertText( ) method of the TokenEdit class of FIG. 4.

Referring to FIG. 8A, there is shown a first of two flowcharts (the other is FIG. 8B) depicting the steps of the insertText( ) method 212 as it walks over the two token streams 138, 431. This figure omits description of the insertText( ) method 212 initialization steps, some of which have been described in reference to FIG. 5A. As part of the initialization steps, a subset of the insertText variables 216 are set as follows:

insertTextPosition 221=editPoint.element_position; (in the preferred embodiment, the insertion point is always in the first token of the TSS 314.1);

insertLength 222=length of insertText 314.1;

newPointTokenPos 223=firstTokIndex of the token stream segment 138;

newPointCharPos 224=insertTextPosition+insertLength;

prevOldToken 225=NULL;
oldCharIndex 226=0;
newCharIndex 227=0;
replaceRange 244=an empty token range positioned at the beginning of the token segment 138; and
new_list 250=an empty list of tokens.

Once these variables are initialized, the insertText( ) method 212 initiates a loop in which it performs the parallel walk over the old and new token streams 138, 431. As the first step in the loop, the insertText( ) method 212 determines whether newCharIndex 227 is less than oldCharIndex 226+ insertLength 222 (702). If this condition is true (702-Y), then the walk of the new token stream is behind the old stream and insertText 212 gets another new token (nextNewToken 229) by calling get_LexData( ) 302.1 (704) and setting the variable nextNewTokenLength 230 to the length of the returned token (704).

If the nextNewToken 229 returned by get$_L$_exData( ) 302.1 is a whitespace quasi token (706), the insertText( ) method 212 determines whether the point just after the newly inserted text falls within the range of characters just lexed as whitespace (708). This condition is represented in C++ pseudocode as: "if (newPoint 242 is NULL &&
  newCharIndex 227<=newPointCharPos 224 &&
  newPointCharPos 224<=newCharIndex 227+ nextNewTokenLength 230)."

If this condition is true (708-Y), the insertText( ) method 212 records newPoint 242 as being at the beginning of the next token (710) and proceeds to step (712). If this condition is false (708-N), proceed to step (712), where insertText( ) 212 adds the length of the whitespace token just examined to newCharIndex 227 (712) and proceeds to step (734), where the lccp end condition is evaluated.

If the condition (706-N) is false, then nextNewToken 229 is not a whitespace quasi token and the insertText( ) method 212 begins to process nextNewToken 229 accordingly. As the first step in processing a non-whitespace token, the insertText( ) method 212 determines whether the point just after the newly inserted text falls within the range of characters just lexed (corresponding to the nextNewToken 229) (714). As in the case of a nextNewToken 229 that is a whitespace token, this condition is represented in pseudo C++ code as:
"if (newPoint 242 is NULL &&
  newCharIndex 227<=newPointCharPos 224 &&
  newPointCharPos 224<=newCharIndex 227+ nextNewTokenLength 230)."

If this condition is true (714-Y), the insertText( ) method 212 sets newPoint.token_position to newPointTokenPos 223 and newPoint.element_position to (newPointCharPos 224 - newCharIndex 227) (716) and proceeds to step (718). If this condition is false (714-N), proceed to step (718) where new stream positional variables are updated as follows:

1. newCharIndex 227 is advanced by the length of the nextNewToken 229;
2. newPointTokenPos 223 is incremented by 1, reflecting the fact that another new token has been walked; and
3. nextNewToken 229 is appended to the list of new tokens 250.

If the condition 702 is false (702-N), indicating that the walk of the old stream is behind or equal to the walk of the new stream, insertText( ) 212 examines the next token from the old stream (i.e., the token stream segment 138). Note that, consistent with the loop invariant that states that the update for an insertion will have been computed only when the newCharIndex 227 equals oldCharIndex 226+ insertLength 222, the condition of equality indicates that another token needs to be walked from the old stream.

As the first step in walking the old token stream, insertText 212 retrieves the next token (nextOldToken) 228 from the token stream segment 138 (720). Next, insertText( ) 212 determines whether it needs to account for a separator between nextOldToken 228 and the last old token previously examined prevOldToken 225 (722) before examining nextOldToken. If the prevOldToken 225 is non-NULL and there is a separator between prevOldToken 225 and nextOldToken (722-Y), insertText( ) 212 walks over the separator and increments oldCharIndex 226 by 1, reflecting the fact that a separator is treated as one character in the old text stream 411 (724). The insertText( ) method 212 does not at this time examine nextOldToken 228, but nulls out prevOldToken 225 so the next loop iteration will not examine the separator between prevOldToken 225 and nextOldToken (726). When insertText( ) 212 does not need to examine a separator, it updates its state variables to account for the fact that the next item to examine in the old token stream 138 is a token (728). It does this by adding the length of nextOldToken 228 to OldCharIndex 226, setting the contents of prevOldToken 225 equal to the nextOldToken 228 and adding 1 to replaceRange.lastTokIndex (meaning that nextOldToken 228 in the token stream segment 138 is to be replaced as part of the computed update) (728).

At this point, regardless of whether insertText( ) 212 just examined a new token or an old token, it evaluates the loop repeat condition (734), which, in C++ pseudo code is represented as:

"while ((newCharIndex 227!=oldCharIndex 226+ insertLength 222) || (newCharIndex 227<newPointCharPos 224));"

This condition is true when:

(1) newCharIndex 227 is not equal to the sum of old-CharIndex 226 and insertLength 222 (indicating that the walk of the old token stream segment 138 is not at the same character position as the walk of the new token stream 431 ); OR (2) newCharIndex 227 is less than newPointCharPos 224 (indicating that the new token stream has not yet been walked up to the point where the insertion occurred). When the condition 734 is true (734-Y), insertText( ) 212 repeats the loop from step (702).

When the loop condition 734 is false (734-N), the loop is terminated and the following are true:

(0) the loop invariants still hold true;

(1) newCharIndex 227 EQUALS oldCharIndex 226+ insertLength 222 (indicating that both streams have been walked to the same character position);

(2) newCharIndex 227>=newPointCharPos 224 (all the newly inserted characters in the new stream have been walked); and (3) newPoint 242 is non-NULL and points just after the last character inserted, represented in coordinates meaningful after the replacement.

In some cases, the computed update that results from the loop may be non-minimal in that it would result in one or more tokens in the old token stream located at the beginning of replaceRange 244 being replaced by equivalent new tokens in the new_list 250. The InsertText( ) method 212 checks for this possibility at the conclusion of the walk with an iteration of the following form; if the first old token included in replaceRange 244 is equivalent to the first token in the new_list 250 of tokens, then (a) advance the beginning index of replaceRange 244 by 1, thereby excluding the equivalent old token, (b) remove the first new token from new_list 250, and (c) repeating until there are no more such equivalent tokens (736).

For example, consider the following situation, where the token stream segment 138 consists of three tokens: "ab" 158-10, "+" 158-11 and "c" 158-12 located at token positions 72, 73 and 74 in the token stream 158, and where the insertText 314.3 consists of a single space "_" typed between the two characters of the token "ab" (i.e. insertPoint=(72,1)). In this situation, the insertText( ) method 212 walks in parallel the old token stream 138 just described and a new token stream 431 consisting of five tokens: "a", "□" (a whitespace quasi token 335), "b", "+" and "c". In this situation, a subset of the insertText variables 216 would be initialized with the following values:

| | |
|---|---|
| insertTextPosition 221 = 1 | (indicating there is one character to the left of the editPoint) |
| insertLength 222 = 1 | (indicating that insertText 314.3 has a length of 1) |
| newPointTokenPos 223 = 72 | (the first token in TSS is 158-10 "ab" at token position 72) |
| newPointCharPos 224 = 2 | (the end of insertText 314.2 is at character position 2 in the new text stream 413) |
| prevOldToken = NULL; | |
| oldCharIndex 226 = 0 | |
| newCharIndex 227 = 0 | |
| replaceRange.firstTokIndex = 72; | |
| replaceRange.lastTokIndex = 72; | (replaceRange is initialized to an empty range positioned at the beginning of the old token stream 138 being walked) |
| newPoint = NULL; | |
| new_list 250 = {}, an empty list of tokens; | |

After the initialization step, the insertText( ) method 212 performs the following loop iterations (results of each conditional step are shown in the matched parentheses "( )" and of each execution step in matched curly brackets "{ }" ):

Iteration 1:
execute step 702 (condition is true because newCharIndex (0) is less than the sum of oldCharIndex(0)+ InsertLength(1)) execute step 704 {
nextNewToken="a";
nextNewTokenLength=1;}
execute step 706 (condition is false b/c nextNewToken is not a whitespace quasi token 335)
execute step 714 (condition is false b/c newPointCharPos is not within nextNewToken)
execute step 718 {
newCharIndex=1;
newPointTokenPos=73;
append "a" to new_list={"a"};}
execute step 734 (loop end condition not true because haven't walked the new text stream 413 as far as newPointCharPos)

Iteration 2:
execute step 702 (condition is false because newCharIndex(1) is not less than the sum of oldCharIndex(0) and InsertLength(1)) execute step 720 {
nextOldToken="ab" 158-10;}
execute step 722 (condition is false because there is no separator to account for between nextOldToken ("ab") and prevOldToken (NULL))
execute step 728
{oldCharIndex=oldCharIndex(0)+lengthNextOldToken (2)=2;

prevOldToken=158-10="ab";
replaceRange.lastTokIndex=73;/* include "ab" in range of old tokens to be replaced"*/
execute step 734 (loop end condition not true because haven't walked the new text stream as far as newPointCharPos)

Iteration 3:
execute step 702 (condition is true because newCharIndex (1) is less than the sum (3) of oldCharIndex(2) and InsertLength(1))
execute step 704 {
nextNewToken="□";
nextNewTokenLength=1;
execute step 706 (condition is true b/c nextNewToken is whitespace quasi token)
execute step 708 (condition is true b/c newPointCharPos is within nextNewToken, or, because:
newPoint 242 is NULL &&
newCharIndex (1)<=newPointCharPos (2) &&
newPointCharPos (2)<=newCharIndex (1)+ nextNewTokenLength (1)"
execute step 710 {
newPoint.TP=newPointTokenPos (73)+1=74;
newPoint.EP=0;/* place newPoint at the beginning of the "b" token in new token stream 431 */
newCharIndex=newCharIndex(1)+insertLength(1)= 2}execute step 734 (loop end condition not true because still haven't lexed enough tokens of the new token stream 431)

Iteration 4:

execute step 702 (condition is true because newCharIndex(2) is less than the sum (3) oldCharIndex(2)+InsertLength(1))
execute step 704 {
nextNewToken = "b";
nextNewTokenLength = 1;}
execute step 706 (condition is false b/c nextNewToken is not Whitespace)
execute step 714 (condition is false b/c newPointCharPos is not within nextNewToken)
execute step 718 {
newCharIndex =    newCharIndex(2) +
                  nextNewTokenLength(1) = 3;
newPointTokenPos = 74;
append "b" to new_list = {"a","b"};}
execute step 734 (loop end condition is now true because:
newCharIndex(3) = oldCharPos(2) + insertLength(1) AND
newCharIndex(3) >= newPointCharPos(2)).

Following the last iteration, the insertText( ) method 212 returns the following values in the context of the TokenEdit object 132:

| | |
|---|---|
| newPoint = (74,0) | the point just after the inserted text will be located at position (74,0) after the change is made; i.e., at the beginning of token "b"; |
| replaceRange = (72,73) | the range of tokens in the token stream 138 to replace consists of the token "ab" 158-10; and |
| new_list = {"a","b"} | the new tokens replacing the tokens in the replaceRange are "a" and "b". |

A pseudo C++ representation of the insertText( ) method 212 and the deleteChar( ) method 232 are provided in Appendices A, B and C. For those unfamiliar with C++ syntax, comments are delimited by a "//" symbol at the extreme left of the comment and program statements are concluded with a semicolon ";". As in other programming languages, C++ variable declarations comprise a variable type and identifier, such as "integer startTokenPosition," which declares a variable "startTokenPosition", of the type "integer". Similarly, C++ function declarations can specify a return type and an argument list in addition to the function name. A declared function with a return value is invoked so that the return value is assigned to another variable of a compatible type. For example, the statement "newTextStream=InsTextTokenIstream(lexRange, insertText, editPoint)" calls the InsTextTokenIstream( ) method 312.2 with appropriate arguments and assigns to the variable "newTextStream" the pointer to the newly created text stream that is returned by InsTextTokenIstream( ) 312.2. As do other programming languages, C++ and the pseudo C++ syntax employed in these appendices provide loop statements that specify a loop end condition and then the series of statements that compose the body of the loop. The loop statements, as well as function statements and statements that are conditionally executed, are delineated by matched curly brackets "{}". For example, a do loop is specified with the syntax: "do {loop statements } while (end condition);". While this description should provide adequate background for understanding the APPENDICES, each pseudocode statement is adjoined by C++ comments providing a detailed explanation of the statement.

More specifically, APPENDIX A provides definitions of the data structures and conventions used by the "istream" classes 310, 320, 340. These data structures have already been described; however the names used in APPENDIX A, which may differ in some cases from those used in this description, are consistent with the representation of the data structures in appendices B and C. As for the other appendices, APPENDIX B sets out some of the key steps of the insertText( ) method 212 and APPENDIX C sets out some of the key steps of the deleteChar( ) method 232. Note that the main differences between the deleteChar( ) 232 and insertText( ) 212 methods are that:

1. The deleteChar( ) method 232 takes only two inputs: the token range segment 138 (identified as "TSS" in FIG. 4) and the editPoint, where the editPoint is assumed to be a position within the token range segment 138 and where the editPoint specifies that a single character at that position be deleted.

2. There are additional assumptions about the position of editPoint, namely that: it is not at the end of a line; it is not at the end of the token stream 158; and it is not at the end of a token except when there is a separator following the token (in which case the editPoint specifies that the separator be deleted; i.e., that an attempt be made to join the two tokens on either side of editPoint).

3. The output of newPoint specifies the location at which the character was deleted, expressed in coordinates that will be meaningful once the resulting suggested token stream update 138' has been made.

4. The deleteChar( ) method 232 need not consult the lexical analyzer in cases where the character to be deleted constitutes a single-character token; in this case the suggested token stream update 138' can be computed immediately to have the effect of removing the token with no replacement.

5. The new text stream given as input to the lexical analyzer (class IncrLexemeStream 300) is an instance of DelCharTokenIstream 320, whose constructor accepts a token range from which to read characters and a character position relative to the first token at which a single character should be deleted in computing the new text stream.

6. The decision at step 702 concerning which of the streams to walk next is expressed as newCharIndex>oldCharIndex>1, reflecting the fact that the new text stream will be missing one character relative to the old text stream.

7. The decision at step (708) and possible action at step (710) are not necessary, because this particular situation does not occur in the case of deletion.

8. The loop condition at step (734) is expressed in C++ pseudocode as: "while ((newCharIndex!=oldCharIndex - I) I I (newCharIndex<newPointCharPos) )". This condition is true when the correct number of characters have not been walked from the new token stream relative to the token stream segment 138 ); OR the new token stream bar not yet been walked up to the deletion point.

The extended lexical type data generated by the tokenizer 132 are critical to the success of the present editor 122 as they provide information to the typographical display processor 170 that allows it to typeset the line being edited before it has been completed by the user and before it has been syntactically analyzed by the structural analyzer 150. For example, based on extended lexical type data, the prettyprinter 170 is able to typeset the incomplete floating point token "1.0E" or the illegal token "1.0E@" according to the display specification for a completed floating point expression, while displaying the extended lexical type information (e.g., that the token is incomplete or ill-formed) in such a manner as to assist the user in completing or correction the token (e.g., by highlighting the illegal token in red). This would not be possible using a conventional approach to configuring a lexical analyzer, particularly in regard to the useful treatment of the many erroneous tokens generated as the user enters the program.

Of course, the fact that the editor 122 can provide lexical information that is displayed by the prettyprinter as the user types would be of no value to users unless they could easily interact with and edit the program being displayed. Thus, to achieve a high level of user acceptance, users should be able to interact with the displayed program as if it were textually, not structurally, represented. This implies that cursor movement and whitespace representation in the present editor should approximate that in conventional text based editors for the most common editing operations. How the present editor 122 does this is described in the cross-referenced, related application, System and Method for Inter-token Whitespace Representation and Textual Editing Behavior in a Program Editor (Ser. No. 08/499,284).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

64

APPENDIX A
Definition of Variables and Conventions used in Pseudocode

1. Background

This code supports an interactive editor for computer programs. Two conceptualizations of source code are relevant to this editor: as text (a sequence of characters) and as tokens (a sequence of lexical units, where each token contains some characters). Source code is represented in this system as tokens (with no explicit representation of whitespace between tokens), but the user is intended to visualize and edit the source code as if it were text.

This code acts as the interface between the keystroke executive in the editor (where navigation, cursor management, and certain kinds of editing operations can be performed directly) and a conventional lexical analyzer, unmodified lex in this case (where lexical analysis of text strings written in the target language can be analyzed). The keystroke executive uses this code only when lexical knowledge of the target language is required.

This code analyzes how a simple textual insertion or deletion at a particular point in the token stream representation would be reflected as an update to the token stream, taking into account the lexical rules of the language being used. The result of such an analysis encapsulates enough information to carry out the change, but does not actually make the change.

2. Coordinate Systems

Supporting the illusion that tokens are text requires careful attention to how location information in the two conceptualizations is related.

2.1 Text Coordinates

Text coordinates are conventional. A text location is the position between two adjacent characters in a text stream, represented as an integer index from 0 through M, where the stream contains M characters. The value of the index corresponds to the number of characters to the left of the position. Thus, the beginning of a text stream is position 0, and the end is position M.

The character at a particular position is the character (if any) to the immediate right of the designated position. Thus, the first character in a text stream is at position 0, the last is at position M-1, and there is no character at position M.

2.2 Simple Token Coordinates

A simple token location is the position between two adjacent tokens in a token stream, represented as an integer index from 0 through N, where the stream contains N tokens. The value of the index corresponds to the number of tokens to the left of the position. Thus, the beginning of a token stream is position 0, and the end is position N.

The token at a particular position is the token (if any) to the immediate right of the designated position. Thus, the first token in a stream is at position 0, the last is at position N-1, and there is no token at position N.

2.3 Token Ranges

A token range (expressed in the pseudocode as type "TokenRange") is a pair of simple token coordinates (a,b), where 0 <= a <= b <= N, that identifies the possibly empty subsequence of tokens in a stream between the two positions. Thus, token range (0,1) includes

65 exactly one token, the first in the sequence, and the range (1,3) contains the following two tokens. The range (0,0) is empty. The range (1,1) is also empty, although at a different position. The range (0,N) contains the entire stream.

2.4 Edit Points

An editing point, or simply "point", (expressed in the pseudocode as type "TextRef") is a pair consisting of a simple token location and a text location. The text location refers to a position in the text contained by the token at the token location. Thus, point (0,0) is just before the first character of the first token, and the point (0,1) is just after the first character of the first token. Point (0,M), where the first token contains M characters, is immediately after the final character of the first token.

When there is no separator present at a token position (see below), the following two points are logically equivalent and indistinguishable to a user:
    (n,m)        at end of token n, which contains m characters, and
    (n+1,0)     at beginning of token n+1.

3. Token Replacement

The primitive operation for changing the contents of a token stream is the replacement of a sub-range of tokens (specified by a TokenRange) with a list of newly created tokens. Thus, the task of the code described here is to translate text-oriented editing operations (insertion and deletion of characters at some TextRef) into token replacement operations.

4. Separators

Source code in the editor contains no explicit representation of whitespace between tokens (although there may be whitespace characters embedded in string literals). Instead, a single, virtual "separator" may (or may not) be understood to be present at each token position, i.e. between each pair of adjacent tokens.

4.1 Separator Criterion

A separator is by definition present at a token position when there are tokens on either side of the position and when some whitespace characters would be required in an equivalent textual representation in order to preserve the meaning of the program. Thus, for example, a separator would be present in the position between tokens "a" and "b" (for languages such as C and Pascal). However a separator would not be present between the tokens "a" and "+", since the two text representations "a+" and "a +" mean the same thing in those languages.

Because the presence of a separator between adjacent tokens in a stream is implied by the lexical characteristics of the two adjacent tokens, separators implicitly appear and disappear as tokens are replaced in the stream.

4.2 Separator Representation

Separators are not stored explicitly, but are instead implied by the lexical properties of the two adjacent tokens. The presence of a separator is conceptually determined by table lookup on the two tokens, where the table can be computed from the lexical properties of the language.

4.3 Separator Behavior

Separators, when present, are intended to behave something like "smart spaces" in a word processor, meaning that there can never be more than one in any token position. When a

66 separator is present at token position n, then the two positions described earlier are not logically equivalent, but instead behave as if there were a space character between them:
- (n,m)     at end of token n, which contains m characters, and
- (n + 1,0) at beginning of token n + 1.

In order to emulate "smart space" behavior, the keystroke executive takes the following actions when the user attempts to insert a space at the two positions described (with a separator present).
- (n,m)     move the cursor over the separator to (n + 1,0), and
- (n + 1,0) do nothing.

The response of the keystroke executive to the press of a space bar when the point is between tokens with no separator present is somewhat more complex, but likewise does not require lexical analysis. Thus, the implementation described here embodies the assumption that it will not be called upon to insert a space between tokens.

5. The Edit Point After Token Replacement

The keystroke executive must determine where, relative to the new token stream (i.e. the token stream after a replacement has been made), each change actually took place. Given that tokens can shift and change, and that separators can appear or disappear in response to simple editing operations, this information cannot be determined once the change has been computed. Thus, an additional task of the code described here is to compute the point of change, represented in coordinates that are meaningful after the change. In the case of insertion, the position is just after the last character inserted.

6. Token Edit Objects

The keystroke executive requires that computed changes not be carried out immediately, but rather be described in such a way that the executive, operating in a broader context, can determine whether to actually carry out (apply) the change or not. The task of this code, then, is to create an object (of type TokenEdit) that describes a potential change, represented by three values:
- a TokenRange (existing tokens to remove),
- a list of tokens (new tokens to insert in their place), and
- a TextRef (the new point, represented in coordinates that are meaningful after the change has been made).

The TokenRange may be empty (in which case the only effect is to insert tokens). The list of new tokens may be empty (in which case the only effect is to delete tokens). Both may be empty (in which case the operation has no effect). In many cases, however, tokens are both removed and inserted, as simple textual editing operations can have a wide variety of effects on the lexical properties of surrounding tokens.

67

APPENDIX B:
Pseudocode for InsertText() method 212

```
// 7. Inserting Text

// 7.1 Inputs

// Insert text accepts three inputs:

// 1. line: a TokenRange identifying the range of tokens which the
//    editing operation is permitted to affect (characteristically a
//    single line of code).

// 2. point: a TextRef identifying a position at which the text should
//    be inserted. point is assumed to be within line.

// 3. insertText: a non-empty string of characters to be inserted
//    (length 1 for an ordinary keystroke).

// Assumptions about the input:
// 1. point is within line
// 2. if point is between tokens then insertText does not contain space characters // 7.2 Output // A TokenEdit object corresponding to a textual insertion, consisting of
// 1. replaceRange: a TokenRange that identifies tokens to be removed;
// 2. newTokens: a list of new tokens to be inserted; and
// 3. newPoint: a TextRef identifying the change point, in coordinates
//    that will be meaningful after the change has been made // 7.3 Insert Text Pseudocode

{ // BEGIN INSERT TEXT

// Establish the range of tokens over which change to the token stream should
    // be considered. Assume without loss of generality that the lexical changes resulting
    // from a textual editing operation are bounded. In particular, change is assumed not
    // to be possible to the left of the token containing the edit point (or the token just to
    // the left of the editing point in cases where the point rests between adjacent tokens,
    // and when there is no separator between the point and the token on its left). It is
    // further assumed that change is not possible past the end of the line containing the
    // point. These assumptions are not intrinsic, but are rather characteristic of
    // reasonable languages and editing systems. Either assumption could be relaxed.

integer startTokenPos = the position of the leftmost token on the line that has a character
    adjacent to the point;
    // If point is within a token, this is the position of the containing token;
    // if point is between tokens on the line with no separator present,
    // then position of token to the left; if between tokens with separator
    // present, then the position of token to the left (if point is left of separator),
    // else the token position of point; if point is at beginning of line, then
    // the token position of point.

integer endTokenPos = token position just to right of last token on line;
    // This is position "end", where line = TokenRange (begin,end)
```

68

```
      // The token range that will be examined for possible change.
      lexRange = TokenRange(startTokenPos,endTokenPos);

// Where in the first token of lexRange the new text should be inserted?
 5    integer insertTextPosition = character offset of point;

// Initialize the new TokenEdit object that will be returned when done.
      // Start with an empty range, positioned at the beginning of lexRange.
      replaceRange = TokenRange(startTokenPos,startTokenPos);
10    newTokens = empty list of tokens;
      newPoint = NULL;

// How many characters are to be inserted.
      integer insertLength = length of string insertText;
15
      // Initialize the computation that determines the point immediately after
      // the inserted text, represented in new token coordinates. This can
      // only be computed incrementally within the loop, since information
      // about the relationship between explicit whitespace and separators
20    // is lost once the loop terminates.
      integer newPointTokenPos = startTokenPos;
      integer newPointCharPos = insertTextPosition + insertLength;

// Prepare for a parallel walk of both the old (before any change)
25    // and new (after the potential change) token streams, recording
      // details of the needed changes, and stopping when no further
      // change is needed. In order to do this, conceptually operate over
      // 4 different streams: old tokens, old text, new text, and new
      // tokens. The conceptual transformation map is:
30    //   1. old tokens -> old text (convert old tokens to conceptual text,
      //      translating separators to "strong" whitespace characters that
      //      preserve lexical boundaries);
      //   2. old text -> new text (insert new text at point);
      //   3. new text -> new tokens (lexically analyze, counting whitespace).
35    // The implementation is arranged so that the transformations can be
      // implemented lazily, meaning that they can be computed on demand,
      // token by token, as the algorithm examines parts of the stream.

// The parallel walk stops when a token boundary after the insertion
40    // point is reached where the (conceptually) same character is the
      // first character of a token in both the old and new token streams.
      // At this point there can be no further lexical effects of the
      // change.

45    // The stopping criterion is implemented by counting characters in
      // the conceptual old and new text streams; they can be compared
      // since they differ only by the insertion of the new text.

// Initialize walk of old tokens, keeping track of the token
50    // previously seen.
      token prevOldToken = NULL;

// Count characters seen in old text coordinates, with separators
      // counting as 1
55    integer oldCharIndex = 0;

// Create the new text stream, produced by reading old tokens and
```

69

```
    // translating them into text, but also inserting the new text at
    // the specified position in the text of the first token. The new
    // text stream produces its contents only on demand, one token at a
    // time, in general without copying.
5   newTextStream =
        InsTextTokenIstream(lexRange, insertText, insertTextPosition);

// Run the lexical analyzer over the new text stream, producing
    // tokens only on demand. Quasi-tokens that contain whitespace found by
10  // the lexer are also returned, so that an exact correspondence can
    // be maintained between characters in the new text stream and token
    // boundaries in the new token stream.
    lexStream = IncrLexemeStream(newTextStream);

15  // Count characters seen by lexer in new text coordinates, including
    // whitespace characters reported by the lexer.
    integer newCharIndex = 0;

do {  // Begin loop.
20
        // Each iteration walks over a single discrete chunk of either the old or new token
        // stream, attempting to locate positions where the stopping condition holds. For the
        // purpose of this loop, chunks of the old token stream include both tokens and
        // separators. Chunks of the new token stream include both tokens and
25      // whitespace quasi-tokens returned by the lexer.

// Loop invariants:

// 1. The token range replaceRange includes those tokens in the old token stream that
30      // have already been examined. If there is separator between the last examined token and
        // its successor, then the separator has been examined when prevOldToken is NULL,
        // otherwise it has not yet been examined.

// 2. Characters in the old text stream examined so far (0 through position oldCharIndex)
35      // correspond to a conversion of the old token stream examined so far (the tokens
        // in replaceRange) to text, with separators in the old token stream converted to a
        // single whitespace character.

// 3. Characters in the new text stream (which is equivalent to the old text stream with
40      // the new text inserted) examined so far (0 through position newCharIndex) correspond
        // to characters that have been converted by the lexer to tokens, either ordinary tokens
        // or quasi-tokens whose only role is to report whitespace seen by the lexer.

// 4. The list of tokens newTokens includes all ordinary tokens that have been produced
45      // the by the lexer so far. It does not include the quasi-tokens whose only role is to
        // report whitespace.

// 5. newPoint is non-NULL iff we have walked at least to the end of the newly inserted
        // text, i.e.
50      //    newCharIndex >= newPointCharPos // 6. When newPoint is non-NULL, it refers to the position just past the inserted
        // text, represented in new token coordinates.

55      if (newCharIndex < oldCharIndex + insertLength) {
            // The walk of the new streams is behind the old streams,
            // measured in text stream coordinates. Move along new stream
```

70

```
      // by lexing another token.

nextNewToken = get next token from lexStream;
      integer nextNewTokenLength = length of text in nextNewToken;
 5
      if (nextNewToken is whitespace) {
          // Unlike conventional lexing, which skips whitespace, the
          // lexer is configured to treat groups of adjacent whitespace
          // characters as quasi-tokens. These must be counted for the
10        // old and new text coordinates to be comparable.

if (newPoint is NULL &&
              newCharIndex < = newPointCharPos &&
              newPointCharPos < = newCharIndex + nextNewTokenLength) {
15
              // The point just after the newly inserted text falls within
              // the range of characters just lexed as whitespace; record
              // the representation of this point in new coordinates.
              // This only makes sense (and in fact can only be recorded)
20            // when this happens at the end of the whitespace, i.e. when
              // newPointCharPos = newCharIndex + nextNewTokenLength.

// The new point is at the end of the whitespace just lexed.
              // Record it at the beginning of the next token.
25            newPoint = TextRef(newPointTokenPos, 0);
          }
          // Add in length of whitespace token just seen
          newCharIndex = newCharIndex + nextNewTokenLength;
          // Done handling new whitespace token
30    } else {
          // nextNewToken is a regular token, not whitespace
          if (newPoint is NULL &&
              newCharIndex < = newPointCharPos &&
              newPointCharPos < = newCharIndex + nextNewTokenLength) {
35            // The point just after the newly inserted text falls within
              // the range of characters just lexed in nextNewToken; record
              // the representation of this point in new coordinates.
              newPoint = TextRef(newPointTokenPos, newPointCharPos - newCharIndex);
          }
40        // Add in length of token
          newCharIndex = newCharIndex + nextNewTokenLength;
          // Keep track of which new token we're at
          newPointTokenPos = newPointTokenPos + 1;
          // Add the new token to the TokenEdit object
45        append nextNewToken to newTokens list;
          // Done handling new non-whitespace token
      }
      // Done moving along the "new" streams
  } else {
50    // newCharIndex > = oldCharIndex + insertLength // Walk of the new streams is ahead of or equal to the old
      // streams (and by invariant, if they are equal then we haven't
      // walked over the newly inserted text, so we must keep going).
55
      // Move along the old stream
      nextOldToken = token just after the end of replaceRange;
```

71

```
        if (prevOldToken is non-NULL and there is a separator between
                prevOldToken and nextOldToken) {
            // The next thing in the old stream is a separator, so move over it.
            // Count the separator as one character in the old text stream
            oldCharIndex = oldCharIndex + 1;
            // Don't look at nextOldToken this time around, but null out
            // prevOldToken so we won't worry about separators next time around.
            prevOldToken = NULL;
        } else {
            // The next thing in the old stream is a token, so add
            // in its length.
            oldCharIndex = oldCharIndex + length of text in nextOldToken;
            prevOldToken = nextOldToken;

// Adjust replaceRange so that it includes nextOldToken
            add 1 to last position in replaceRange;
        }
        // Done moving along old streams
    }

} while ((newCharIndex != oldCharIndex + insertLength)
        || (newCharIndex < newPointCharPos));

// Done with the walk; the following are true.
// 0. Loop invariants still true (see above).
// 1. newCharIndex == oldCharIndex + insertLength
//    Have walked both streams to the same (original character position)
// 2. newCharIndex >= newPointCharPos
//    Have examined all the newly inserted characters in the new stream.
// 3. newPoint is non-NULL and points just after the last character
//    inserted, represented in coordinates meaningful after the replacement.

// In some cases the TokenEdit object resulting from the walk may be
// redundant in that one or more tokens at the beginning of
// replaceRange would be replaced by an equivalent new token.
// Minimize the edit by trimming these away.

while (length of replaceRange > 0 and
        length of newTokens > 0 and
        first token in replaceRange is equivalent to first in newTokens) {
    add 1 to first position in replaceRange;
    remove first member of newTokens;
}
// Done constructing new TokenEdit object
return TokenEdit object
}

// END INSERT TEXT
```

72

APPENDIX C:
Pseudocode for DeleteChar() method 232

```
// 8. Deleting a Character

// 8.1 Inputs

// Delete character accepts two inputs:

// 1. line: a TokenRange identifying the range of tokens which the
//    editing operation is permitted to affect (characteristically a
//    single line of code).

// 2. point: a TextRef identifying the character to be deleted.

// Assumptions about the input:
// 1. point is within line
// 2. point is not at end of line
// 3. point is not at end of the token stream
// 4. point is at end of a token only if a separator follows
//    (in which case the separator is deleted)

// 8.2 Output

// A TokenEdit object corresponding to a textual deletion, consisting of
// 1. replaceRange: a TokenRange that identifies tokens to be removed;
// 2. newTokens: a list of new tokens to be inserted; and
// 3. newPoint: a TextRef identifying the change point, in coordinates
//    that will be meaningful after the change has been made // 8.3 Delete Character Pseudocode

{ // BEGIN DELETE CHARACTER

// Establish the range of tokens over which change to the token
    // stream should be considered. Assume without loss of generality
    // that the lexical changes resulting from a textual editing
    // operation are bounded. In particular, change is assumed not to
    // be possible to the left of the token containing the edit point
    // (or the token just to the left of the editing point in cases
    // where the point rests between adjacent tokens, and when there is
    // no separator between the point and the token on its left). It is
    // further assumed that change is not possible past the end of the
    // line containing the point. These assumptions are not intrinsic,
    // but are rather characteristic of reasonable languages and editing
    // systems. Either assumption could be relaxed.

integer startTokenPos = the position of the leftmost token on the line
        that has a character adjacent to the point;
    // If point is within a token, this is the position of the containing
    // token; if point is between tokens on the line with no separator
    // present, then position of token to the left; if between tokens
    // with separator present, then the position of token to the left
    // (if point is left of separator), else the token position of
    // point; if point is at beginning of line, then the token position
```

73

```
      // of point.

integer endTokenPos = token position just to right of last token on line;
      // This is position "end", where line = TokenRange (begin,end)
 5
      // This is the token range that will be examined for possible change.
      lexRange = TokenRange(startTokenPos,endTokenPos);

// Which character in the first token of lexRange should be deleted.
10    // In the case where the character offset is equal to the number of
      // characters in the token (the maximum permissible value in the
      // TextRef representation), then the point is just after the last
      // character in the token. In this case it is assumed that there is
      // a separator following, and that the separator should be deleted
15    // (i.e. the separator at that token position should not be replaced by
      // "strong" whitespace, as is otherwise done). This typically
      // results in two adjacent tokens becoming one.
      integer deleteCharPosition = character offset of point;

20    // Initialize the new TokenEdit object that will be returned when done.
      // Start with an empty range, positioned at the beginning of lexRange.
      replaceRange = TokenRange(startTokenPos,startTokenPos);
      newTokens = empty list of tokens;
      newPoint = NULL;
25
      if (deleteCharPosition = 0 and size of first token = 1) {
          // This is a special case where we need no further analysis. The
          // character to be deleted is the only character in a 1-character token.
          add 1 to last position in replaceRange;
30        newPoint = point;
          // Done handling this special case; the token will be removed.
      } else {
          // This is the general case.

35        // Initialize computation of the deletion point, represented in
          // new token coordinates. This can only be computed incrementally
          // within the loop, since information about the relationship
          // between explicit whitespace and separators is lost once the
          // loop terminates.
40        integer newPointTokenPos = startTokenPos;
          integer newPointCharPos = deleteCharPosition;

// Prepare for a parallel walk of both the old (before any change)
          // and new (after the potential change) token streams, recording
45        // details of the needed changes, and stopping when no further
          // change is needed. In order to do this, conceptually operate over
          // 4 different streams: old tokens, old text, new text, and new
          // tokens. The conceptual transformation map is:
          //   1. old tokens -> old text (convert old tokens to conceptual text,
50        //      translating separators to "strong" whitespace characters that
          //      preserve lexical boundaries);
          //   2. old text -> new text (delete character or separator at point);
          //   3. new text -> new tokens (lexically analyze, counting whitespace).
          // The implementation is arranged so that the transformations can be
55        // implemented lazily, meaning that they can be computed on demand,
          // token by token, as the algorithm examines parts of the stream.
```

74

```
     // The parallel walk stops when a token boundary after the deletion
     // point is reached where the (conceptually) same character is the
     // first character of a token in both the old and new token streams.
     // At this point there can be no further lexical effects of the
5    // change.

// The stopping criterion is implemented by counting characters in
     // the conceptual old and new text streams; they can be compared
     // since they differ only by the deletion of a character.
10
     // Initialize walk of old tokens, keeping track of the token
     // previously seen:
     token prevOldToken = NULL;

15   // Count characters seen in old text coordinates, with separators
     // counting as 1
     integer oldCharIndex = 0;

// Create the new text stream, produced by reading old tokens and
20   // translating them into text, but also deleting the character at
     // the specified position from the text of the first token. The
     // new text stream produces its contents only on demand, one token
     // at a time, in general without copying.
     newTextStream = DelCharTokenIstream(lexRange, deleteCharPosition);
25
     // Run the lexical analyzer over the new text stream, producing
     // tokens only on demand. Quasi-tokens that contain whitespace
     // found by the lexer are also returned, so that an exact
     // correspondence can be maintained between characters in the new
30   // text stream and token boundaries in the new token stream.
     lexStream = IncrLexemeStream(newTextStream);

// Count characters seen by lexer in new text coordinates, including
     // whitespace characters reported by the lexer.
35   integer newCharIndex = 0;

do {   // Begin loop

// Each iteration walks over a single discrete chunk of either the
40        // old or new token stream, attempting to locate positions where
          // the stopping condition holds. For the purpose of this loop,
          // chunks of the old token stream include both tokens and
          // separators. Chunks of the new token stream include both tokens
          // and whitespace quasi-tokens returned by the lexer.
45
          // Loop invariants:

// 1. The token range replaceRange includes those tokens in the
          // old token stream that have already been examined. If there is
50        // separator between the last examined token and its successor,
          // then the separator has been examined when prevOldToken is NULL,
          // otherwise it has not yet been examined.

// 2. Characters in the old text stream examined so far (0 through
55        // position oldCharIndex) correspond to a conversion of the old
          // token stream examined so far (the tokens in replaceRange) to
          // text, with separators in the old token stream converted to a
```

75

```
// single whitespace character.

// 3. Characters in the new text stream (which is equivalent to
// the old text stream with a character deleted) examined so far
// (0 through position newCharIndex) correspond to characters that
// have been converted by the lexer to tokens, either ordinary
// tokens or quasi-tokens whose only role is to report whitespace
// seen by the lexer.

// 4. The list of tokens newTokens includes all ordinary tokens
// that have been produced the by the lexer so far. It does not
// include the quasi-tokens whose only role is to report
// whitespace.

// 5. newPoint is non-NULL iff we have walked at least to the
// deletion point, i.e. newCharIndex > = newPointCharPos // 6. When newPoint is non-NULL, it refers to the deletion point,
// represented in new token coordinates.

if (newCharIndex < oldCharIndex - 1) {
    // The walk of the new streams is behind the old streams,
    // measured in text stream coordinates. Move along new stream
    // by lexing another token.

nextNewToken = get next token from lexStream;
    integer nextNewTokenLength = length of text in nextNewToken;

if (nextNewToken is whitespace) {
        // Unlike conventional lexing, which skips whitespace, the
        // lexer is configured to treat groups of adjacent whitespace
        // characters as special tokens. These must be counted for
        // the old and new text coordinates to be comparable.

// Add in length of whitespace token just seen
        newCharIndex = newCharIndex + nextNewTokenLength;
        // Done handling new whitespace token
    } else {
        // nextNewToken is a regular token, not whitespace
        if (newPoint is NULL &&
            newCharIndex < = newPointCharPos &&
            newPointCharPos < = newCharIndex + nextNewTokenLength) {
            // The deletion point falls within the range of characters
            // just lexed in nextNewToken; record the representation
            // of this point in new coordinates.
            newPoint = TextRef(newPointTokenPos, newPointCharPos - newCharIndex);
        }
        // Add in length of token
        newCharIndex = newCharIndex + nextNewTokenLength;
        // Keep track of which new token we're at
        newPointTokenPos = newPointTokenPos + 1;
        // Add the new token to the TokenEdit object
        append nextNewToken to newTokens list;
        // Done handling new non-whitespace token
    }
    // Done moving along the "new" streams
} else {
```

76

```
        // newCharIndex > = oldCharIndex - 1

// Walk of the new streams is ahead of or equal to the old
        // streams (and by invariant, if they are equal then we haven't
        // reached the deletion point, so we must keep going).

// Move along the old stream
        nextOldToken = token just after the end of replaceRange;

if (prevOldToken is non-NULL and there is a separator between
                prevOldToken and nextOldToken) {
            // The next thing in the old stream is a separator, so move over it.
            // Count the separator as one character in the old text stream
            oldCharIndex = oldCharIndex + 1;
            // Don't look at nextOldToken this time around, but null out
            // prevOldToken so we won't worry about separators next time around.
            prevOldToken = NULL;
        } else {
            // The next thing in the old stream is a token, so add
            // in its length.
            oldCharIndex = oldCharIndex + length of text in nextOldToken;
            prevOldToken = nextOldToken;

// Adjust replaceRange so that it includes nextOldToken
            add 1 to last position in replaceRange;
        }
        // Done moving along old streams
    }
    } while ((newCharIndex != oldCharIndex - 1)
             || (newCharIndex < newPointCharPos)) ;

// Done with the walk; the following are true.
    // 0. Loop invariants still true (see above).
    // 1. newCharIndex = = oldCharIndex - 1
    //    Have walked both streams to the same (original character position)
    // 2. newCharIndex > = newPointCharPos
    //    Have walked at least to the deletion point
    // 3. newPoint is non-NULL and points to the deletion point,
    //    represented in coordinates meaningful after the replacement.

// In some cases the TokenEdit object resulting from the walk may be
    // redundant in that one or more tokens at the beginning of
    // replaceRange would be replaced by an equivalent new token.
    // Minimize the edit by trimming these away.

while (length of replaceRange > 0 and
           length of newTokens> 0 and
           first token in replaceRange is equivalent to first in newTokens) {
        add 1 to first position in replaceRange;
        remove first member of newTokens;
    }
    // Done constructing new TokenEdit object
}
return TokenEdit object
}
```

What is claimed is:

1. A process for employing a conventional batch lexer to incrementally lex a computer program internally represented as a stream of tokens while said computer program is being edited, said process enabling said stream of tokens to be updated to reflect editing actions on said program as said editing actions occur, said process comprising the steps of:
- (1) selecting a range of tokens from said stream of tokens that could be affected by an editing action occurring at an editing point within said range of tokens, said editing point being expressed in token coordinates, which comprise a token index and a character-offset within an indexed token;
- (2) forming a hypothetical text stream that is a textual equivalent of said range of tokens and that reflects said editing action, said hypothetical text stream including lexical boundaries corresponding to separators existing at token boundaries within said range of tokens;
- (3) lexing with said batch lexer said hypothetical text stream so as to compute a hypothetical token stream segment that corresponds to said token range after said editing action; and
- (4) computing an updated editing point that unambiguously identifies in token coordinates position of said editing action within said hypothetical token stream; and
- (5) updating said stream of tokens and said editing point using said hypothetical token stream and said updated editing point, respectively.

2. The process of claim 1, wherein said updating step comprises
- replacing tokens identified in said token range with said hypothetical token stream segment; and
- replacing said editing point with said updated editing point.

3. The process of claim 1, further comprising the step of:
- determining a minimum set of tokens differing between said token range and said hypothetical token stream segment so that only a minimum number of tokens need be replaced to incrementally update said token stream segment to reflect said editing action.

4. The process of claim 1, wherein said step of forming said hypothetical token stream segment occurs lazily, one token at a time, said step of lexing said hypothetical text stream comprising:
- inputting one character from said hypothetical text stream;
- when said one character represents a token boundary:
  - inputting additional characters from said hypothetical text stream until a character not representing said token boundary is encountered;
  - forming a WHITESPACE token with an associated length equaling number of token boundary characters adjacent to and including said one character; and
  - adding said WHITESPACE token to said hypothetical token stream segment; and
- when said one character does not represent a token boundary:
  - inputting additional characters from said hypothetical text stream until a character representing said token boundary is encountered;
  - forming a string including said one character and characters adjacent said one character that do not represent said token boundary;
  - classifying said string as a token of a particular extended type according to lexical rules of a computer language in which said computer program was written;
  - forming a new token representing said string with an associated length equaling number of characters in said string; and
  - adding said new token to said hypothetical token stream segment.

5. The process of claim 4, wherein said step of forming said hypothetical text stream occurs lazily, one character at a time, before each of said inputting steps, said step of forming said hypothetical text stream comprising the steps of:
- maintaining a pointer into said token range that identifies a next character to be examined;
- when said next character immediately follows one of said separators and said one separator has not been accounted for in said hypothetical text stream, adding said lexical boundary character to said hypothetical text stream as said one character;
- when a condition selected from 1) said one character follows said one separator and said one separator has been accounted for in said hypothetical text stream or 2) said one character does not follow a separator, is true:
  - when said pointer coincides with said editing point and said editing action has not been accounted for, modifying said hypothetical text stream to reflect said editing action; and
  - when a condition selected from 1) said pointer coincides with said editing point and said editing action has been accounted for or 2) said pointer does not coincide with said editing point, is true:
    - adding said next character to said hypothetical text team as said one character; and
    - updating said pointer to follow said one character.

6. The process of claim 5, wherein, when said editing action is attempted insertion of a text string, said modifying step comprises inserting said text string into said hypothetical text stream at said editing point.

7. The process of claim 5, wherein, when said editing action is attempted deletion of a character, said modifying step comprises omitting said character from said hypothetical text string.

8. The process of claim 1, wherein said step of computing an updated editing point that unambiguously identifies in token coordinates position of said editing action within said hypothetical token stream for an insertion comprises the steps of:
- initializing old and new stream pointers so that said stream pointers are at beginning of said token range and said hypothetical token stream, respectively;
- executing a loop wherein:
  - (1) when said new stream pointer lags position of said old stream pointer incremented by an offset equaling length of said inserted text:
    - retrieving next new token addressed by said new stream pointer;
    - when said new token is a WHITESPACE token:
      - when said new token includes said editing point, storing token index of said new token and offset of said editing point from beginning of said new token as said updated editing point and incrementing said new stream pointer by length of said WHITESPACE token;
      - when said new pointer position is not within a new token that includes said editing point, incrementing said new stream pointer by length of said WHITESPACE token;

else when said new token is not said WHITESPACE token,
when said new token includes said editing point, storing token index of said new token and offset of said editing point from beginning of said new token as said updated editing point and incrementing said new pointer by length of said new token so as to reposition said new pointer after end of said new token;
when said new pointer position is not within a new token that includes said editing point, incrementing said new pointer by length of said new token so as to reposition said new pointer after end of said new token;

(2) else when said new stream pointer does not lag position of said old stream pointer incremented by an offset equaling length of said inserted text:
retrieving next old token at said old stream pointer;
when boundary between said old token and a previous old token includes a separator, incrementing said old stream pointer and said editing point by one to account for said separator;
else when boundary between said old token and said previous old token does not include said separator, incrementing said old stream pointer by length of said next old token so as to reposition said old stream pointer just after end of said old token; and (3) terminating said loop when:
position of said new pointer equals position of said old pointer incremented by an offset determined by said editing action;
said new pointer and said old pointer are positioned at a token boundary; and
said new pointer has addressed said editing point.

9. The process of claim 1, wherein said step of computing an updated editing point that unambiguously identifies in token coordinates position of said editing action within said hypothetical token stream following a deletion comprises the steps of:
initializing old and new stream pointers so that said stream pointers are at beginning of said token range and said hypothetical token stream, respectively;
executing a loop wherein:

(1) when said new stream pointer leads position of said old stream pointer minus one:
retrieving next new token addressed by said new stream pointer;
when said new token is a WHITESPACE token:
incrementing said new stream pointer by length of said WHITESPACE token;
else when said new token is not said WHITESPACE token:
when said new token includes said editing point, storing token index of said new token and offset of said editing point from beginning of said new token as said updated editing point and incrementing said new pointer by length of said new token so as to reposition said new pointer after end of said new token;
when said new pointer position is not within a new token that includes said editing point, incrementing said new pointer by length of said new token so as to reposition said new pointer after end of said new token;

(2) else when said new stream pointer does not lead position of said old stream pointer minus one:
retrieving next old token at said old stream pointer;
when boundary between said old token and a previous old token includes a separator, incrementing said old stream pointer and said editing point by one to account for said separator;
else when boundary between said old token and said previous old token does not include said separator, incrementing said old stream pointer by length of said next old token so as to reposition said old stream pointer just after end of said old token; and (3) terminating said loop when:
position of said new pointer equals position of said old pointer minus one;
said new pointer and said old pointer are positioned at a token boundary; and
said new pointer has addressed said editing point.

10. The process of claim 5, wherein said separators do not exist between said adjacent tokens in said token stream, but instead are inferable from an approximate separator table defining whether said separator exists between adjacent separators having a range of extended lexical types, said separator table being conservative, meaning said table prescribes separators between first and second adjacent tokens when tokens sharing said extended lexical types of said first and second tokens could legitimately be joined according said computer language rules, even though said first and second adjacent tokens could not legitimately be joined.

11. The process of claim 5, wherein said separators do not exist between said adjacent tokens in said token stream, but instead are inferable from an exact separator table defining whether said separator exists between adjacent separators based on individual and lexical attributes of said adjacent tokens.

12. A computer-readable memory that can direct a computer to maintain incrementally an internal token stream representation of a computer program being edited in said computer as said program is being edited, said computer-readable memory comprising:
a keystroke executive that is configured to dispatch each of a subset of input events to a lexical processor as a particular event occurring at a particular position in said token stream and a range of tokens from said token stream that could be affected by said particular event;
said lexical processor being configured to generate a suggested update to said range of tokens and an updated editing point within said suggested update following said particular input event, said lexical processor including:
a token-to-text processor that is configured to convert said range to an equivalent old text stream;
a textual updater that is configured to generate from said old text stream a new text stream that reflects hypothetical effect of said input event on said range of tokens;
a conventional batch lexer that is configured to generate from said new text stream a replacement range of new tokens; and
an edit point updater that is configured to determine position of said updated editing point within said replacement range of tokens;
said lexical processor returning said updated editing point and said replacement range to said keystroke executive as said suggested update at completion of processing of said input event.

13. The computer-readable memory of claim 12, further comprising:
a trimmer that is configured to determine a minimum set of tokens differing between said token range and said replacement range so that only a minimum number of tokens need be replaced to incrementally update said token stream to reflect said editing action.

14. The computer-readable memory of claim 12, wherein said batch lexer is configured to form said replacement range of new tokens lazily, one said new token at a time, said batch lexer being configured to:

input one character from said new text stream;

when said one character represents a token boundary:
input additional characters from said new text stream until a character not representing said token boundary is encountered;
form a WHITESPACE token with an associated length equaling number of token boundary characters adjacent to and including said one character; and
add said WHITESPACE token to said replacement range; and when said one character does not represent a token boundary:
input additional characters from said new text stream until a character representing said token boundary is encountered;
form a string including said one character and characters adjacent said one character that do not represent said token boundary;
classify said string as a token of a particular extended type according to lexical rules of a computer language in which said computer program was written;
form a new token representing said string with an associated length equaling number of characters in said string; and
add said new token to said replacement range.

15. The computer-readable memory of claim 14, wherein said token-to-text processor is configured to form said new text stream lazily, one character at a time, before said one character is input from said new text stream; said token-to-text processor being configured to:

maintain a pointer into said token range that identifies a next character to be examined;

when said next character immediately follows one of said separators and said one separator has not been accounted for in said new text stream, add said lexical boundary character to said new text stream as said one character;

when a condition selected from 1) said one character follows said one separator and said one separator has been accounted for in said hypothetical text stream or 2) said one character does not follow a separator, is true:
when said pointer coincides with said editing point and said editing action has not been accounted for, modify said hypothetical text stream to reflect said editing action; and
when a condition selected from 1) said pointer coincides with said editing point and said editing action has been accounted for or 2) said pointer does not coincide with said editing point, is true:
add said next character to said new text stream as said one character; and
update said pointer to follow said one character.

16. The computer-readable memory of claim 15, wherein, when said editing action is attempted insertion of a text string, said textual updater is configured to insert said text string into said new text stream at said editing point.

17. The computer-readable memory of claim 15, wherein, when said editing action is attempted deletion of a character, said textual updater is configured to omit said character from said new text stream.

18. A computer system enabling computer programs stored in a memory of said computer system to be edited as if they were textually-represented while incrementally maintaining an internal token stream representation of said computer program being edited, said computer system comprising:

a keystroke executive that is configured to dispatch each of a subset of input events to a lexical processor represented as a particular event occurring at a particular position in said token stream and a range of tokens from said token stream that could be affected by said particular event;

said lexical processor being configured to generate a suggested update to said range of tokens and an updated editing point within said suggested update following said particular input event, said lexical processor including:
a token-to-text processor that is configured to convert said range to an equivalent old text stream;
a textual updater that is configured to generate from said old text stream a new text stream that reflects hypothetical effect of said input event on said range of tokens;
a conventional batch lexer that is configured to generate from said new text stream a replacement range of new tokens; and
an edit point updater that is configured to determine position of said updated editing point within said replacement range of tokens;

said lexial processor tokenizer returning said updated editing point and said replacement range to said keystroke executive as said suggested update at completion of processing of said input event.

19. The system of claim 18, further comprising:
a trimmer that is configured to determine a minimum set of tokens differing between said token range and said replacement range so that only a minimum number of tokens need be replaced to incrementally update said token stream to reflect said editing action.

20. The system of claim 19, wherein said batch lexer is configured to form said replacement range of new tokens lazily, one said new token at a time, said batch lexer being configured to:

input one character from said new text stream;

when said one character represents a token boundary:
input additional characters from said new text stream until a character not representing said token boundary is encountered;
form a WHITESPACE token with an associated length equaling number of token boundary characters adjacent to and including said one character; and
add said WHITESPACE token to said replacement range; and when said one character does not represent a token boundary:
input additional characters from said new text stream until a character representing said token boundary is encountered;
form a string including said one character and characters adjacent said one character that do not represent said token boundary;
classify said string as a token of a particular extended type according to lexical rules of a computer language in which said computer program was written;

form a new token representing said string with an associated length equaling number of characters in said string; and add said new token to said replacement range.

21. The system of claim 18, wherein said token-to-text processor is configured to form said new text stream lazily, one character at a time, before said one character is input from said new text stream; said token-to-text processor being configured to:

maintain a pointer into said token range that identifies a next character to be examined;

when said next character immediately follows one of said separators and said one separator has not been accounted for in said new text stream, add said lexical boundary character to said new text stream as said one character;

when a condition selected from 1) said one character follows said one separator and said one separator has been accounted for in said hypothetical text stream or 2) said one character does not follow a separator, is true:

when said pointer coincides with said editing point and said editing action has not been accounted for, modify said hypothetical text stream to reflect said editing action; and when a condition selected from 1) said pointer coincides with said editing point and said editing action has been accounted for or 2) said pointer does not coincide with said editing point, is true:

add said next character to said new text stream as said one character; and update said pointer to follow said one character.

* * * * *

UNITED STATES PATENT AND TRADEMARK OFFICE
CERTIFICATE OF CORRECTION

PATENT NO. : 5,737,608
DATED : April 7, 1998
INVENTOR(S) : Michael L. Van de Vanter It is certified that error appears in the above-indentified patent and that said Letters Patent is hereby corrected as shown below:

In the Claims, Column 64, Claim 10, line 24:

Replace "legitimately be joined according" with --legitimately be joined according to--.

In the Claims, Column 66, Claim 18, line 33:

Replace "said lexial processor tokenizer returning" with --said lexical processor returning--.

Signed and Sealed this

Thirtieth Day of June, 1998

*Attest:*

BRUCE LEHMAN

*Attesting Officer*  *Commissioner of Patents and Trademarks*